US006108539A

United States Patent [19]
Ray et al.

[11] Patent Number: 6,108,539
[45] Date of Patent: *Aug. 22, 2000

[54] NON-TERRESTRIAL CELLULAR MOBILE TELECOMMUNICATION STATION

[75] Inventors: J. C. Ray, Denison; Robert L. George, Plano, both of Tex.; Daniel B. McKenna, Broomfield, Colo.

[73] Assignee: AirCell, Incorporated, Boulder, Colo.

[ * ] Notice: This patent is subject to a terminal disclaimer.

[21] Appl. No.: 08/960,183

[22] Filed: Oct. 29, 1997

Related U.S. Application Data

[63] Continuation-in-part of application No. 08/692,837, Aug. 2, 1996, Pat. No. 5,884,166, which is a continuation-in-part of application No. 07/847,920, Mar. 6, 1992, Pat. No. 5,557, 656.

[51] Int. Cl.[7] ..................................................... H04Q 7/22
[52] U.S. Cl. ........................... 455/430; 455/427; 455/431
[58] Field of Search ................................... 455/430, 427, 455/428, 429, 431, 63, 450, 454

[56] References Cited

U.S. PATENT DOCUMENTS

| | | |
|---|---|---|
| 5,557,656 | 9/1996 | Ray et al. . |
| 5,559,865 | 9/1996 | Gilhousen . |
| 5,822,680 | 10/1998 | Stuart et al. ............................ 455/63 |
| 5,832,380 | 11/1998 | Ray et al. ............................. 455/431 |
| 5,878,346 | 3/1999 | Ray et al. ............................. 455/431 |
| 5,920,804 | 7/1999 | Armbruster et al. .................. 455/430 |
| 5,926,758 | 7/1999 | Grybos et al. ......................... 455/454 |

FOREIGN PATENT DOCUMENTS

| | | |
|---|---|---|
| 89/10626 | 11/1989 | WIPO . |
| 98/11678 | 3/1998 | WIPO . |

*Primary Examiner*—Daniel S. Hunter
*Assistant Examiner*—Thuan T. Nguyen
*Attorney, Agent, or Firm*—Duft,Graziano&Forest, P. C.

[57] ABSTRACT

The non-terrestrial cellular mobile telecommunication station uses a number of non-interference techniques to extend the usage of existing cellular mobile telecommunication radio frequencies allocated for ground-based communications to the non-terrestrial realm. For example, the polarization of the signals produced by the antenna elements of the non-terrestrial cellular mobile telecommunication station is different than and preferably substantially orthogonal to the polarization of the cellular radio signals produced by the ground-based antennas to thereby minimize the possibility of interference with the ground-based radio signals. Furthermore, the control signals exchanged between the non-terrestrial mobile subscriber stations and the non-terrestrial cell site controller are architected to avoid the possibility of interference with ground-based cell site transmitter-receiver pairs. The transmit power of the non-terrestrial cellular mobile telecommunication station is also tightly controlled and of a magnitude to be rejected by the ground-based mobile subscriber stations and cell site transmitter-receiver pairs.

30 Claims, 12 Drawing Sheets

NON-TERRESTRIAL CELLULAR MOBILE TELECOMMUNICATION STATION

CROSS-REFERENCE TO RELATED APPLICATIONS

This application is a continuation-in-part of U.S. patent application Ser. No. 08/692,837, filed Aug. 2, 1996 and titled "Multi-Dimensional Mobile Cellular Telecommunication Network," now U.S. Pat. No. 5,884,166, which is a continuation-in-part of U.S. patent application Ser. No. 07/847,920, filed Mar. 6, 1992 and titled "Mobile Telecommunications," now U.S. Pat. No. 5,557,656.

FIELD OF THE INVENTION

This invention relates to cellular communications and, in particular, to a non-terrestrial cellular mobile telecommunication station that provides service to non-terrestrial mobile subscribers using the same cellular telecommunication channels used by terrestrial cellular mobile telecommunication systems.

PROBLEM

It is a problem in the field of cellular mobile telecommunication services to provide non-terrestrial customers with high quality communication services via a wireless communication medium. Existing cellular mobile telecommunication systems serve terrestrial (termed ground-based herein) mobile subscriber stations, but this service is not presently extensible to non-terrestrial mobile subscriber stations due to signal interference problems between ground-based and non-terrestrial mobile subscriber stations. The regulatory agencies responsible for telecommunications therefore presently do not permit the provision of such service.

Cellular mobile telecommunication systems provide the service of connecting mobile telecommunication customers, each having a mobile subscriber station, to both land-based customers who are served by the common carrier public telephone network as well as other mobile telecommunication customers. In such a system, all incoming and outgoing calls are routed through mobile telecommunication switching offices (MTSO), each of which is connected to a plurality of cell sites (base stations) which communicate with mobile subscriber stations located in the area covered by the cell sites. The mobile subscriber stations are served by the cell sites, each of which is located in one cell area of a larger service region. Each cell site in the service region is connected by a group of communication links to the mobile telecommunication switching office. Each cell site contains a group of radio transmitters and receivers with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station. The first stage of a cellular communication connection is set up when a transmitter-receiver pair in a cell site, operating on a predetermined pair of radio frequencies, is turned on and a mobile subscriber station, located in the cell site, is tuned to the same pair of radio frequencies. The second stage of the communication connection is between the communication link connected to this transmitter-receiver pair and the common carrier public telephone network. This second stage of the communication connection is set up in the mobile telecommunication switching office, which is connected to the common carrier public telephone network by incoming and outgoing trunks. The mobile telecommunication switching office contains a switching network to switch mobile customer voice and/or data signals from the communication link to an incoming or outgoing trunk. The mobile telecommunication system is controlled by a mobile telecommunication controller at the mobile telecommunication switching office and a cell site controller at each cell site associated with the mobile telecommunication switching office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telecommunication controller, control the transmitter-receiver pairs at the cell site. The control processes at each cell site also control the tuning of the mobile subscriber stations to the selected radio frequencies.

Each cell in the ground-based cellular mobile telecommunication network comprises a predetermined volume of space radially arranged around the cell site transmitting antenna with the region of space roughly approximating a cylindrical volume having limited height. Since, all of the mobile subscriber stations are installed in ground-based units (such as motor vehicles) in traditional cellular mobile telecommunication systems, the antenna radiation pattern of the cell site is aligned to be proximate to the ground and the polarization of the signals produced by the cell site antenna is vertical in nature. In order to prevent the radio signals in one cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. Also, Dynamic Power Control (DPC) manages the reverse path (mobile to base) transmit level to further control co-channel interference. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

This existing cellular mobile telecommunication system, with its associated ground-based subscriber stations, is presently in widespread use and has been designed to eliminate the problem of frequency overlap among adjacent cell sites and to minimize the number of frequencies required to serve vast areas without encountering the possibility of frequency overlap. These existing cellular mobile telecommunication systems, with their associated ground-based subscriber stations, are inoperable when the user's mobile subscriber station enters the non-terrestrial realm. In particular, the provision of cellular mobile telecommunication services to aircraft is inconsistent with the architecture of the existing ground-based cellular mobile telecommunication network since the antenna pattern of the existing ground-based cellular mobile telecommunication system broadcasts a signal in a pattern proximate to the ground and the pattern of frequency allocation for the pattern of cell sites is not extensible to aircraft. In particular, an antenna pattern that would be capable of serving a fast moving aircraft would have to cover a sufficient volume of space to minimize the number of station hand offs as the aircraft traverses one cell site after another. For the mobile subscriber station to have an adequate sized cell site in this environment, that cell site would span a large number of the existing ground-based cell sites. Therefore, the existing pattern of frequency reuse would be disrupted and there presently is no frequency allocated or available for allocation to such purpose. If additional frequencies were allocated for non-terrestrial cellular telecommunication use, all existing cellular telecommunication equipment would have to be redesigned to be capable of operating at these new frequencies and yet remain compatible with the existing pattern of cellular telecommunication services.

Thus, the existing ground-based cellular mobile telecommunication subscriber stations and associated network are incapable of being simply extensible to provide service to the non-terrestrial realm and the architecture of choice installed in all ground-based cellular mobile telecommunication systems and subscriber stations is fundamentally inoperable as it stands for use in the non-terrestrial realm. Therefore, the existing cellular mobile communication network is by its very nature simply a two dimensional ground-based system with the inability to be extensible beyond that limited definition. With this limitation, cellular mobile telecommunication services are completely unavailable for aircraft and aircraft must use a separate communication system that operates independent of the existing cellular mobile telecommunication network and which requires its own pattern of transceiver antennas, unique radio equipment and control software.

SOLUTION

The above described problems are solved and a technical advance achieved in the field by the present non-terrestrial cellular mobile telecommunications station (termed herein "non-terrestrial mobile subscriber station") for use in a multidimensional cellular mobile telecommunication system which extends the usage of existing cellular mobile telecommunication frequencies allocated for ground-based cellular communications to the non-terrestrial mobile subscriber stations in a manner that avoids the possibility of signal interference between the ground-based and non-terrestrial mobile subscriber stations. In particular, the multidimensional cellular mobile telecommunication system expands the two-dimensional adjacent cell configuration of the present day ground-based cellular telecommunication network by the addition of an overlay of non-terrestrial cells (coverage areas) of predetermined volume, each of which non-terrestrial cells can overlap numerous ground-based cells and which non-terrestrial cells are three-dimensional in nature. Each non-terrestrial cell in this overlay pattern is of predetermined geometry and locus in space and is preferably adjacent to other non-terrestrial cells so that a plurality of the adjacent non-terrestrial cells completely occupies a large volume of space in the region immediately adjacent to and overlying the existing ground-based cell network. In this manner, the overlay of non-terrestrial cells merges with the existing ground-based cells to form a seamless multidimensional cellular telecommunication network. This multidimensional network can be accomplished by partitioning the existing MTSO switch and creating a virtual network therein.

There are a number of implementation features of this system which are cooperatively operative to enable the non-terrestrial cells and non-terrestrial mobile subscriber stations to operate in conjunction with the ground-based cells and ground-based mobile subscriber stations to provide superior communication performance. These features all function to reduce the possibility of interference between the non-terrestrial and ground-based elements in the resultant multidimensional network and the combination of these features which are used to implement a system is a function of the communication/control technology used for, radio communication, the topography of the terrain, the communication traffic, the implementation cost of the system, and the like. Thus, a multidimensional cellular mobile telecommunication system can be implemented using only a subset of the implementation features described in the present non-terrestrial mobile subscriber station.

The non-terrestrial mobile subscriber station creates an antenna pattern which is insensitive to the reception of cellular signals originating from ground-based subscriber stations and cell sites, and which antenna pattern is transmissive only in a downward or outward direction. In addition, the polarization of the signals produced by the antenna elements of the non-terrestrial mobile subscriber station is a polarization that is different than and preferably substantially orthogonal to the polarization of the ground-based cellular radio signals, such as a horizontal polarization, to thereby minimize the possibility of interference with the vertically polarized ground-based cellular radio signals. Furthermore, the control signals exchanged between the non-terrestrial mobile subscriber stations and the non-terrestrial cell site controller are architected to avoid the possibility of interference channels used for the non-terrestrial mobile subscriber stations are selected such that the control signals transmitted in these channels are unrecognizable to the ground-based mobile subscriber stations and ground-based cell site transmitter-receiver pairs so that even if broadcasts from a non-terrestrial mobile subscriber station reach a ground-based mobile subscriber station or cell site transmitter-receiver pair they cannot be interpreted and are rejected out of hand. Optionally, the non-terrestrial system can switch uplink and downlink frequencies to be the opposite of ground-based mobile subscriber station pattern. In this manner, non-terrestrial cells can be created in the region of space adjacent to and overlying the existing ground-based cells and the existing cellular communication frequencies allocated for ground-based cellular telecommunications can be reused for non-terrestrial cellular telecommunications without the possibility of interaction between the existing ground-based cellular mobile telecommunication system and the non-terrestrial mobile subscriber stations. This is due in part to the fact that interference between these systems is less likely because the forward path in the ground-based system transmits more power and the signals output from the non-terrestrial stations are low gain. Furthermore, the transmit and receive frequencies for non-terrestrial communications can be offset, in the interstitial space, from the ground-based frequencies. The non-terrestrial cells can be managed in a manner that is analogous to, yet separate from, the management of the ground-based cells so that hand offs from one non-terrestrial cell to another are managed independent of, but in a control manner similar to that used for the ground-based cells.

Thus, by reusing the presently allocated cellular radio frequencies and the control philosophies of the present day ground-based cellular mobile telecommunication systems, redesign of the existing equipment is minimized and the necessity for new apparatus is reduced to a minimum. To the mobile telecommunication switching office, the non-terrestrial cells all operate in harmony with the existing cell sites with no discernible differentiation among cells or stations, be they ground-based or non-terrestrial in nature because the switch is partitioned to create a virtual network. In this manner, the existing two dimension mobile cellular telecommunication network is extensible by use of these non-terrestrial mobile subscriber stations to create a multi-dimensional cellular mobile telecommunication system which makes use of the presently allocated cellular radio frequencies and presently provided services.

DETAILED DESCRIPTION

The present non-terrestrial mobile subscriber station operates with a multidimensional cellular mobile telecommunication system to extend the usage of existing cellular mobile telecommunication radio frequencies allocated for ground-based communications in a manner that avoids the possibility of signal interference between the ground-based and non-terrestrial mobile subscriber stations. In particular, the multidimensional cellular mobile telecommunication system adds an overlay of non-terrestrial cells of predetermined geometry and locus in space to the existing ground-based cellular mobile telecommunication network and architects the communication protocol to reduce the possibility of interference by using at least one and preferably a plurality of techniques. A first technique is that the polarization of the cellular radio signals produced by the non-terrestrial antenna elements can be a polarization that is different than and preferably substantially orthogonal to the polarization of the cellular radio signals produced by the ground-based antennas, such as a horizontal polarization, to thereby minimize the possibility of interference with the nominally vertically polarized ground-based cellular radio signals. Another technique is that the control signals exchanged between the non-terrestrial mobile subscriber stations and the non-terrestrial cell site controller can be architected to avoid the possibility of interference with ground-based cell site transmitter-receiver pairs. In particular, the control channels used for the non-terrestrial mobile subscriber stations are selected such that the control signals transmitted in these channels are generally unrecognizable to the ground-based mobile subscriber stations and cell site transmitter-receiver pairs, so that even if broadcasts from a non-terrestrial mobile subscriber station reach a ground-based mobile subscriber station or cell site receiver, they cannot be interpreted and are rejected out of hand. Other techniques are described herein. In order to provide the proper context for the description of the present non-terrestrial mobile subscriber station, the underlying multi-dimensional cellular mobile telecommunication system is described prior to the description of the non-terrestrial mobile subscriber station.

Architecture of a Cellular Mobile Telecommunication System

Figure 1:
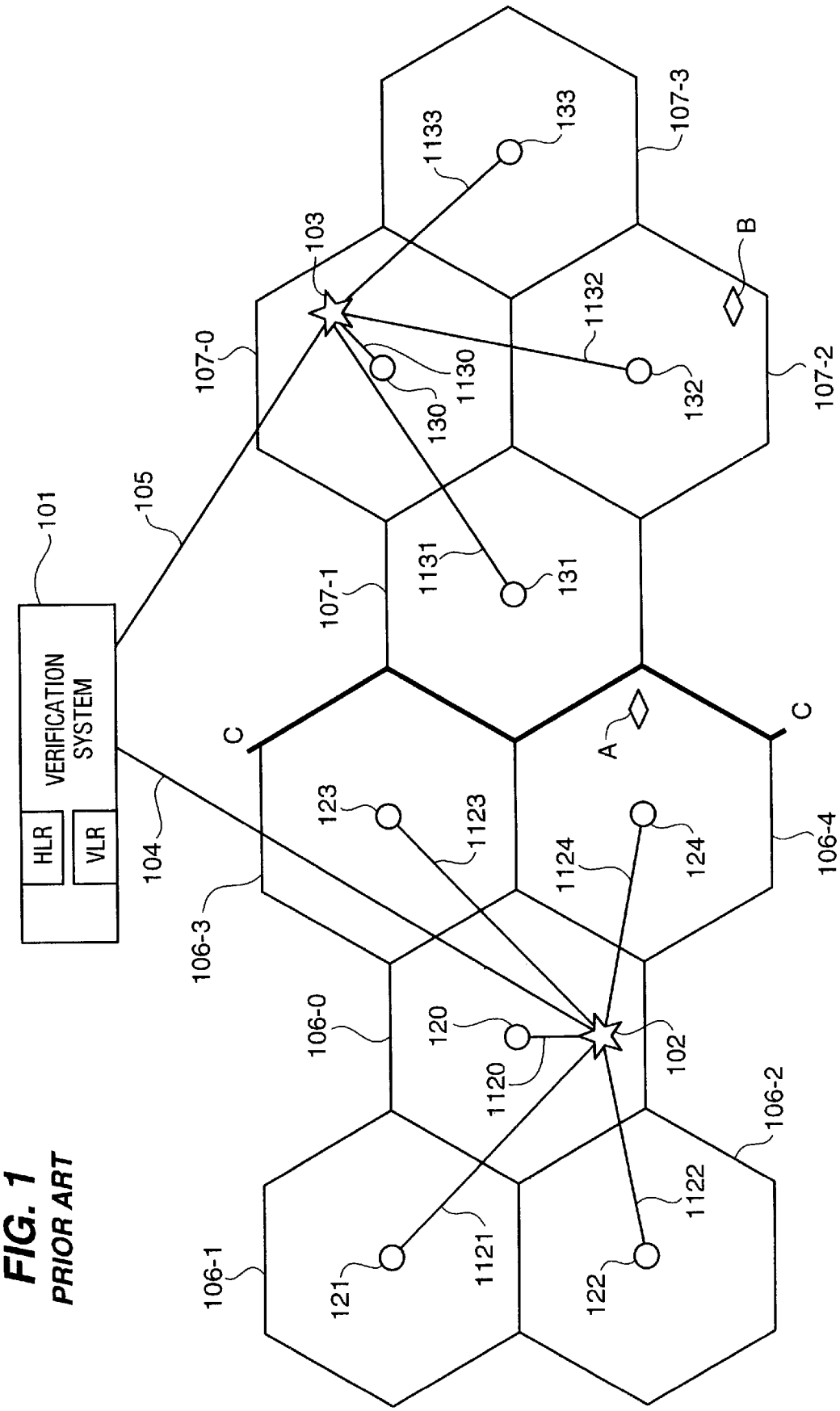
FIG. 1 illustrates a typical prior art ground-based cellular mobile telecommunication system that includes a plurality of mobile telephone switching offices.

FIG. 1 illustrates a typical prior art ground-based cellular mobile telecommunication system which includes a plurality of mobile telephone switching offices (MTSO) 102, 103, each of which is connected via communication facilities 1120–1124, 1130–1133 to a plurality of cell site transmitter-receiver pairs 120–124, 130–133 (also termed base stations herein). The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between subscriber stations and the transmitter-receiver pairs as well as the nature of the data transferred therebetween, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between subscriber stations located in the cells and the associated transmitter-receiver pairs located at the cell site for each of these cells.

For the purpose of illustration, two mobile subscriber stations A, B are shown in FIG. 1 and are located within cells 106-4, 107-2, respectively. A plurality of the cells 106 are interconnected with a designated mobile telecommunication switching office 102, which serves to interconnect the transmitter-receiver pairs 120–124 in the various cells 106 served by the mobile telecommunication switching office 102 with the public switched telephone network (PSTN) to access other mobile telecommunication switching offices as well as conventional telephone apparatus. The cellular mobile telecommunication system also includes a verification system 101 which is interconnected with the mobile telecommunication switching offices 102, 103 via data links 104, 105, respectively. The verification system 101 functions to authenticate the identity of the mobile subscriber stations A, B and authorize the provision of cellular telecommunication services to these subscribers. The verification system 101 includes a Home Location Register (HLR) that contains data indicative of authorized subscribers resident in the call coverage area of this system and a Visitor Location Register (VLR) that contains data indicative of authorized subscribers who are not resident in the call coverage area of this system, but are presently active therein.

The range of a particular cellular service is determined by the geographic location of the cells. In addition, cellular mobile telecommunication systems are not connected on a nationwide basis. Rather, the industry consists of many distinct geographical regions that serve a specific (home) base of subscribers. For example, in FIG. 1, the bold line C—C denotes a boundary between two cellular regions, with mobile telecommunication switching office 102 being located in a first of these regions and mobile telecommunication switching office 103 being located in a second adjacent region. When cellular subscribers leave their home geographical region, they become "roamers." When a roaming subscriber places a cellular telephone call from their mobile subscriber station, the mobile telephone switching office that provides service has no way of determining if this roamer is a valid subscriber or not, since this information is located in the roamer's home system in the Home Location Register contained therein. Obtaining the information from the home switch, and notifying the foreign mobile telecommunication switching office of the roamer's status is one function of the verification system 101, illustrated in FIG. 1. Once verified, it is stored in the Roaming Territory VLR typically for 24 hours.

The cellular radio telecommunication service provided in North America, for example, is designed primarily for motor vehicles and other ground-based mobile subscriber stations. The system presently in use uses a plurality of radio frequency channels in the Ultra-High Frequency (UHF) band. A channel in this system comprises a pair of UHF frequencies in the designated band. One frequency in the channel is termed the "forward" carrier and is used for transmissions from the base station to the mobile subscriber station, while the other frequency in the pair is termed the "reverse" carrier and is used for transmissions from the mobile subscriber station to the base station. Present technologies in use include analog Frequency Modulation (FM) as the method for transmitting the signal with a 30 kHz frequency channel spacing for the Advanced Mobile Phone System (AMPS) and a 10 kHz frequency channel spacing for the Narrowband Advanced Mobile Phone System (NAMPS). There is also digital transmission capability in some systems, wherein a plurality of signal slots (included in the term "channels" as used herein) are multiplexed on to the same carrier, with the 30 kHz spacing between adjacent bands in a TDMA system and a 1.25 MHz spacing in a CDMA system. A total of 832 30 KHz channels are available for cellular telephone use, and these channels are located between the frequencies of 824 MHz to 849 MHz, and 869 MHz to 894 MHz. The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels are subdivided into seven groups of approximately 56 channels when used with a seven cell channel reuse plan, termed a K=7 plan.

Multidimensional Cellular System Control Channels

In this existing regulated communication environment, a particular problem is encountered when attempting to use cellular mobile telephone equipment from a non-terrestrial location, such as an aircraft. The elevated position of the mobile cellular telephone station when located aboard an aircraft causes the signal to be broadcast over a wide area of the surface of the earth, where it is received by many ground-based cell site transmitter-receiver pairs. In addition, the signal strength at a plurality of these ground-based cell site transmitter-receiver pairs may be substantially equal, making determination of the controlling base station a difficult choice. Thus, mobile cellular subscriber stations are prohibited by law from transmitting from aircraft.

The cellular telephone network requires a minimum signal-to-noise ratio to enable the communications to be of an acceptable quality. When deployed as a Multidimensional Cellular System, the presently required minimum separation between signal power level and the background or noise power level is typically approximately 8–10 dB for the non-terrestrial subscriber station and 6–8 dB for the cell-site receiver for interference free communications. However, existing terrestrial cellular systems require a +17–+18 dB C/N+1 ratio to maintain a high quality call connection. Thus, the non-terrestrial cellular communication portion of the multidimensional system must provide adequate signal strength by the appropriate selection and siting of antenna elements within the constraints of available signal power. In addition, the interference between ground-based and non-terrestrial mobile subscriber stations must be obviated by the signal characteristics as well as communication control philosophy.

Figure 10:
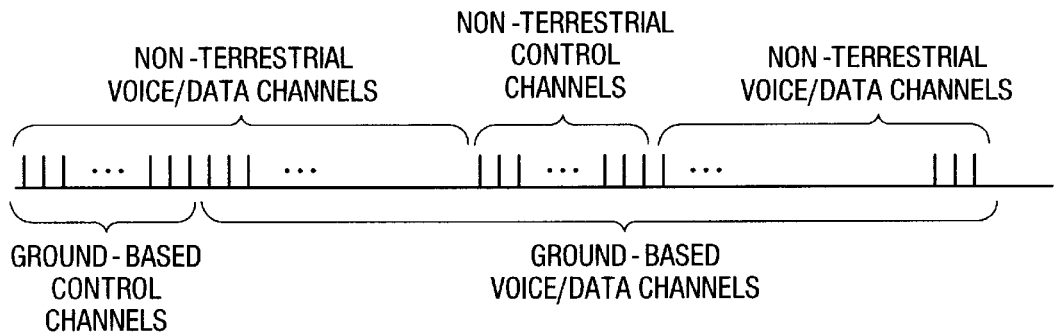
FIG. 10 illustrates the non-terrestrial cellular frequency allocation for a typical cell.

The communication control philosophy portion of this unique solution comprises a manipulation of the control channels such that control signals originated by a non-terrestrial mobile subscriber station cannot cause either a ground-based cell site receiver or ground-based mobile subscriber station receiver to receive and interpret these control signals. The reception of signals in the allocated frequency spectrum is beyond the practical control of the system, so the designation of control channels within the plurality of available channels represents the method of bifurcating the volume of space into two disjunct regions: ground-based and non-terrestrial. As shown in FIG. 10, the control channels dedicated for use by the non-terrestrial mobile subscriber stations are those which are designated as voice/data communication channels for the ground-based mobile subscriber stations. Thus, each ground-based cell site transceiver communicates with the ground-based mobile subscriber stations extant in its cell on predetermined control channels, which control channels are ignored by non-terrestrial mobile subscriber stations, since these channels are voice/data communication channels in the view of the non-terrestrial mobile subscriber stations. Similarly, each non-terrestrial cell site transmitter-receiver pair communicates with the non-terrestrial mobile subscriber stations extant in its cell on predetermined control channels, which control channels are ignored by ground-based mobile subscriber stations, since these channels are voice/data communication channels in the view of the ground-based mobile subscriber stations. Thus, the allocation of control channels in the non-terrestrial cells represents a paradigm shift with respect to the adjacent ground-based cells. This philosophy can be implemented in a cost effective manner, since the large installed base of ground-based mobile subscriber stations and ground-based cell site transmitter-receiver pairs inherently reject control signals transmitted in the voice/data communication channels. It is only the newly constructed non-terrestrial mobile subscriber stations and their associated cell site transmitter-receiver pairs which must be modified to reassign control channels. This implementation incurs a relatively small cost.

An alternative implementation of the communication control philosophy comprises allocating a subset of the available channels exclusively to non-terrestrial cellular communications, with this subset of dedicated channels being divided into control channels and communication channels as with the existing channel allocation pattern. This can be done in either the AMPS/NAMPS environment or more simply in the digital transmissions paradigm of CDMA/TDMA systems where signal slots can be dedicated to non-terrestrial communication. However, the dedication of even a small number of channels can be problematic, since these channels are removed from all ground-based cells and can have significant impact on traffic handling capacity. In addition, such a solution requires the modification of all existing equipment.

Frequency Reuse Pattern

Mobile cellular telecommunication systems provide a plurality of concurrently active communications in the same service area, with the number of concurrently active communication connections exceeding the number of available radio channels. This is accomplished by reusing the channels via the provision of multiple base stations in the service area that is served by a single mobile telecommunication switching office. The overall service area of a mobile telecommunication switching office is divided into a plurality of "cells", each of which includes a base station and associated radio transmission tower, as shown in FIG. 1. The radius of the cell is basically the distance from the base station tower to the furthest locus at which good reception between the mobile subscriber station and the base station can be effected. The entire service area of a mobile telecommunication switching office is therefore covered by a plurality of adjacent cells. There are typical cell reuse patterns and, typically, seven sets of channels are reused though the number can range from K=3 to K=21. Within a particular cell, the surrounding six cells are grouped in a circle around the first cell and the channels used in these six cells differ from the channels used in the particular cell and from each of the other six surrounding cells. Thus, the signals emanating from the radio transmission tower in the particular cell do not interfere with the signals emanating from the radio transmission towers located in each of the six surrounding cells because they are at different frequencies. In addition, the next closest cell using the transmission frequency of the particular cell is far enough away from this cell that there is a significant disparity in signal power and therefore sufficient signal rejection at the receivers to ensure that there is minimal signal interference. The shape of the cell is determined by the surrounding terrain and is typically not circular, but skewed by irregularities in the terrain, the effect of buildings and vegetation and other signal attenuators present in the cell area. Thus, the cell pattern of FIG. 1 is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber stations and the base station. When a call is initiated, the control channel is used to communicate between the mobile subscriber station involved in the call and the local serving base station. The control messages locate and identify the mobile subscriber station, determine the dialed number, and identify an available voice/data communication channel consisting of a pair of radio frequencies which is selected by the base station for the communication connection. The radio unit in the mobile subscriber station retunes the transmitter-receiver equipment contained therein to use these designated radio frequencies. Once the communication connection is established, the control messages are typically transmitted to adjust transmitter power and/or to change the transmission frequency when required to handoff this mobile subscriber station to an adjacent cell, when the subscriber moves from the present cell to one of the adjoining cells. The transmitter power of the mobile subscriber station is regulated since the magnitude of the signal received at the base station is a function of the transmitter power and the distance from the base station. Therefore, by scaling the transmitter power to correspond to the distance from the base station, the received signal magnitude can be maintained within a predetermined range of values to ensure accurate signal reception minimizing interference with other transmissions in the adjacent cells which are reusing the same frequency.

When a mobile unit approaches the boundary of a cell, the radio signal received at the base station is at a minimum level. Since the mobile unit is at the boundary of two cells, the signal power from the mobile transmitter is equal to or greater than at the serving cell and a handoff procedure is initiated. Handoffs are initiated by comparison of mobile receive power at the serving cell and adjacent candidate cells. First, the cell base station initiates a mobile unit location process in the six adjoining cells. This is accomplished either by activation or continuous operation of a locating receiver in each of the six adjoining cells which tunes to the radio frequency and channel on which the mobile subscriber station is transmitting. The measured signal strength of this signal, as received at each of the six adjoining cells, is compared and the strongest signal is indicative of the cell which is to receive the handoff. If there is an available voice channel in that cell, the mobile subscriber station is sent a message on the control channel to re-tune its transmitter to the identified available voice channel at the transmitter frequency of the selected cell. Simultaneously, the voice connection is switched at the base stations from one cell to the next via the Mobile Telecommunication Switching Office to provide uninterrupted service.

Multidimensional Cellular Mobile
Telecommunication Network

Figure 2:
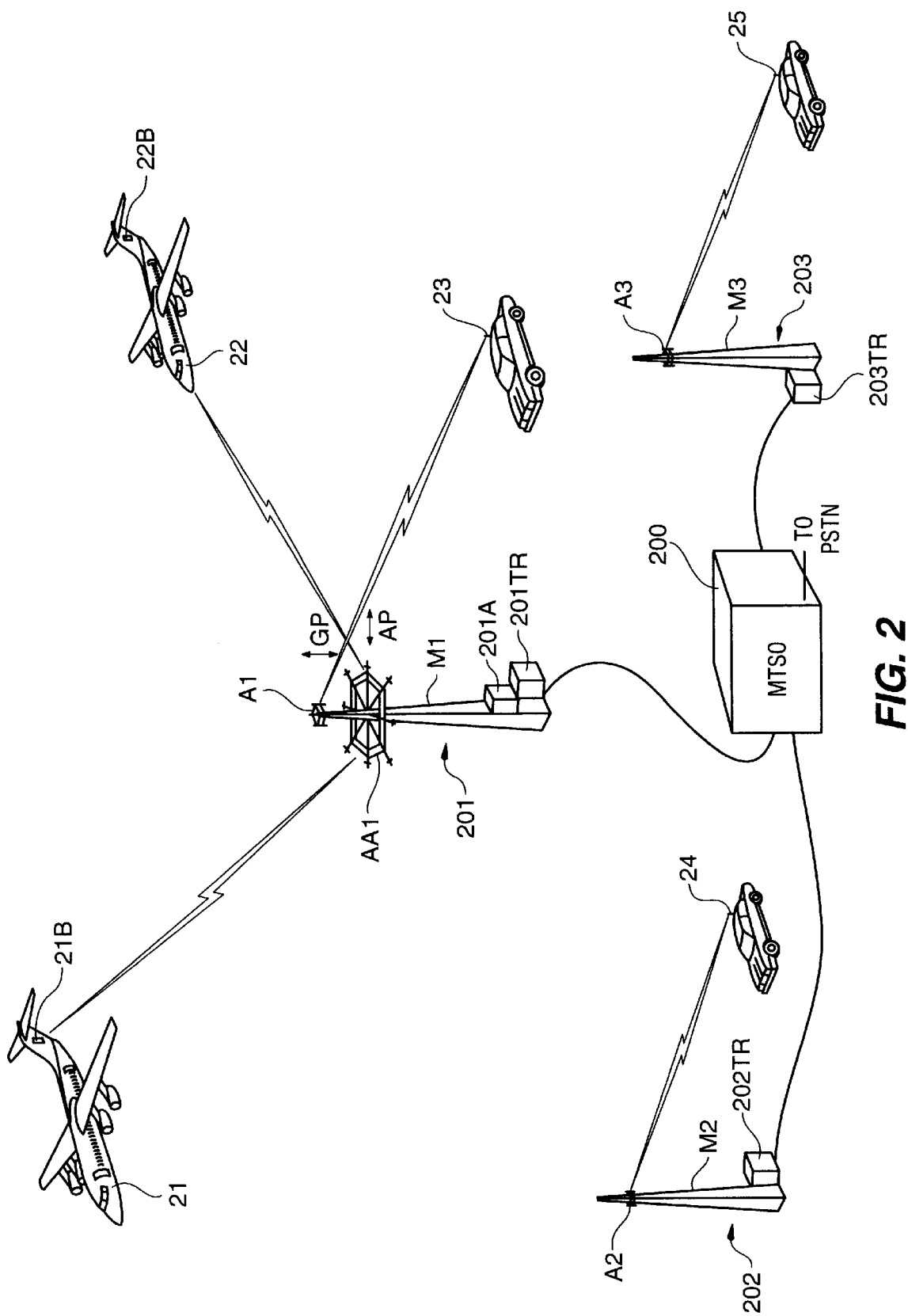
FIG. 2 illustrates in block diagram view, the overall architecture of the multidimensional cellular telecommunication network.

The multidimensional cellular mobile telecommunication network of the present invention is illustrated in block diagram form in FIG. 2. This diagram illustrates the basic concepts of the multidimensional cellular mobile telecommunication network and, for the purpose of simplicity of illustration, does not comprise all of the elements found in a typical network. The fundamental elements disclosed in FIG. 2 provide a teaching of the interrelationship of the various elements which are used to implement a multidimensional cellular mobile telecommunication network.

The basic ground-based cellular telecommunication network of the prior art is incorporated into this system to enable the non-terrestrial mobile subscriber stations to be integrated into the existing service structure. In particular, the mobile telecommunication switching office 200 serves to interconnect a plurality of ground-based cells 201, 202, 203 with the public switched telephone network (PSTN), as noted above. The ground-based cells 201, 202, 203 each include a transmitter-receiver pair 201TR, 202TR, 203TR and an antenna complex, which typically comprises a mast M1, M2, M3 to which is affixed one or more antenna elements A1, A2, A3, respectively.

Existing cellular mobile telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation from the noise and interference. The antenna structure used in ground-based mobile cellular telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna. The polarization of these signals is vertical in nature, shown by arrow GP (Ground Polarization) in FIG. 2.

The mobile telecommunication switching office MTSO is partitionable via software to divide the physical area covered by the cells into two or more segments, one of which segments can optionally overly another segment. Typically, in ground-based cellular telecommunication systems, the available channels are divided between two competing cellular carriers so that the service area is served by the two carriers. However, this partition ability enables the multidimensional mobile cellular telecommunication network to create a virtual cell network of non-terrestrial cells which coexists with the existing ground-based mobile cellular telecommunication network. This virtual cell network works with multiple existing ground-based mobile cellular telecommunication systems, different equipment, different vendors, different frequencies, can even be different technologies: digital/analog or TDMA/CDMA or FM/AM/PSK. The multidimensional mobile cellular telecommunication network is seamless and overlaid on existing ground-based cellular telecommunication network.

The multidimensional cellular mobile telecommunication network adds to the existing mobile cellular telecommunication network one or more non-terrestrial cells. A non-terrestrial cell is defined as an installation which is equipped with at least one non-terrestrial cell site transmitter-receiver pair, such as 201A and an associated antenna AA1 for receiving and transmitting cellular telecommunication transmissions to and from non-terrestrial mobile subscriber stations, such as aircraft 21, 22, which are equipped with mobile subscriber station apparatus 21B, 22B. The non-terrestrial transmitter-receiver pair 201A is interconnected to the public switched telephone network PSTN via the mobile telecommunication switching office MTSO. The non-terrestrial cell site antenna AA1 has a radio signal radiation pattern which is typically directed above a horizontal plane encompassing the antenna. The majority of the radiated radio signal is directed at angles above the horizontal plane, which angles are typically greater than 4% in magnitude to avoid interference with ground-based mobile cellular telephone stations 23, 24, 25. In addition, the polarization of these radio signals is selected to be substantially orthogonal to the polarization of the radio signals emanating from the ground-based antennas, and is typically horizontally polarized, as shown by arrow AP (Air Polarization) in FIG. 2.

The non-terrestrial cell site transmitter-receiver pair 201A can be integrated with an existing ground-based cell site transmitter-receiver pair, in that there is some sharing of equipment which mounts the antenna elements on a common mast M1 and/or interconnects both cell site transmitter-receiver pairs to the public switched telephone network PSTN. In the embodiment of FIG. 2, the non-terrestrial cell site antenna elements AA1 are mounted on the same mast M1 as the antenna elements A1 used to implement the ground-based cell site.

Multidimensional Cellular System Implementation Issues

Figure 3:
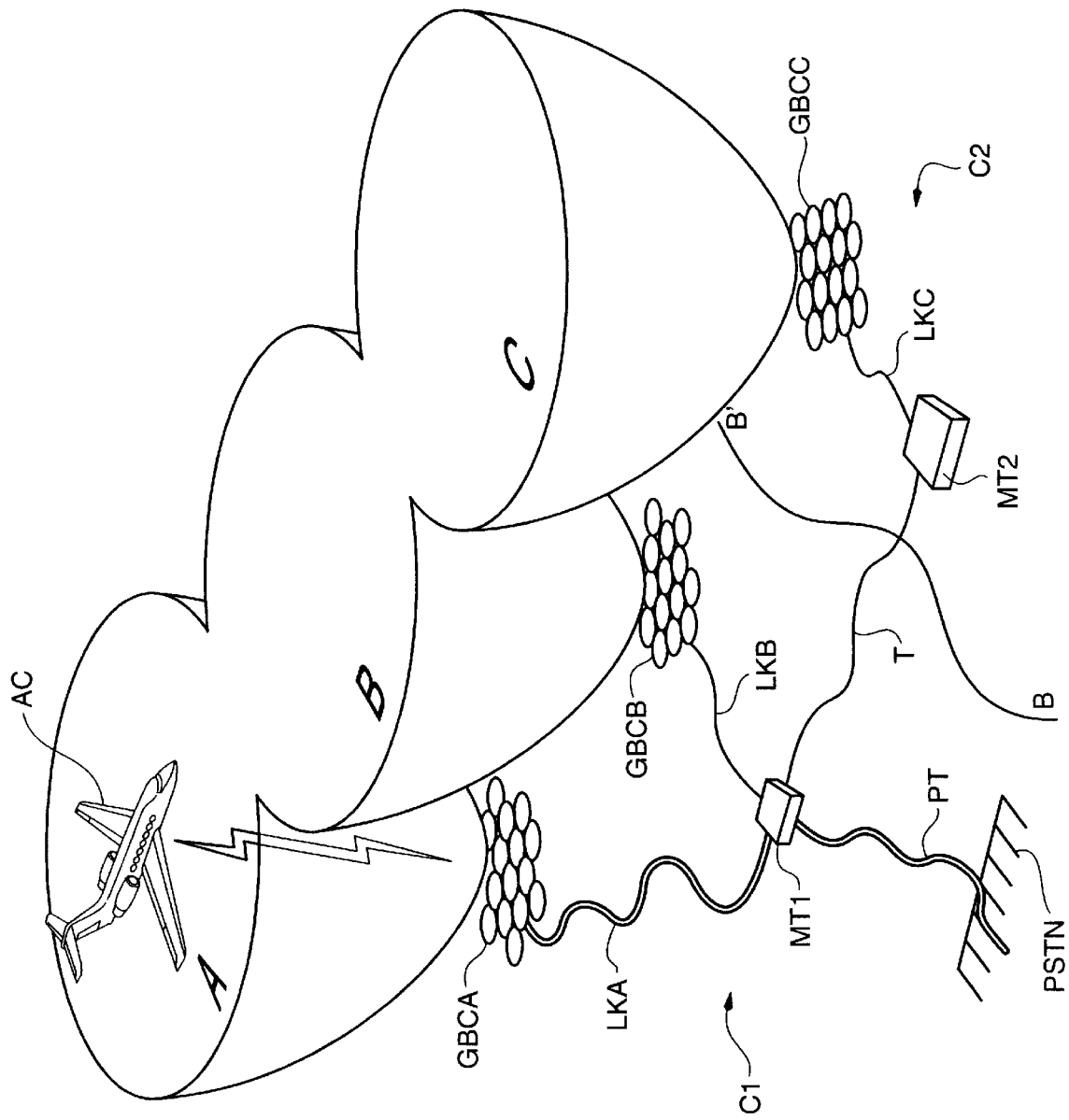
FIGS. 3–5 illustrate perspective views of a multi-cell non-terrestrial cellular mobile telecommunication system as well as the relative geographical extent of the ground-based cells and typical non-terrestrial cells.
Figure 4:
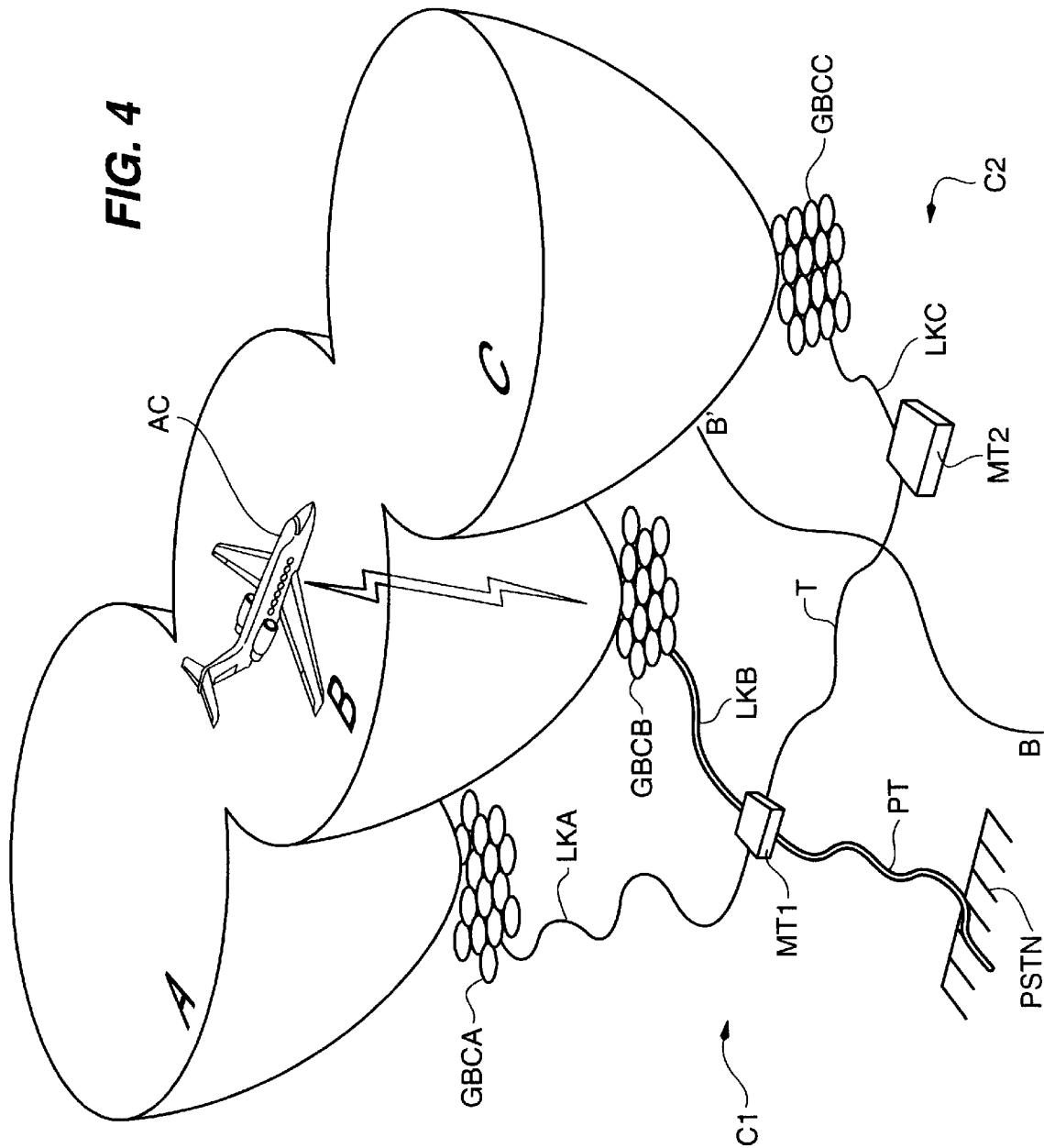
Figure 5:
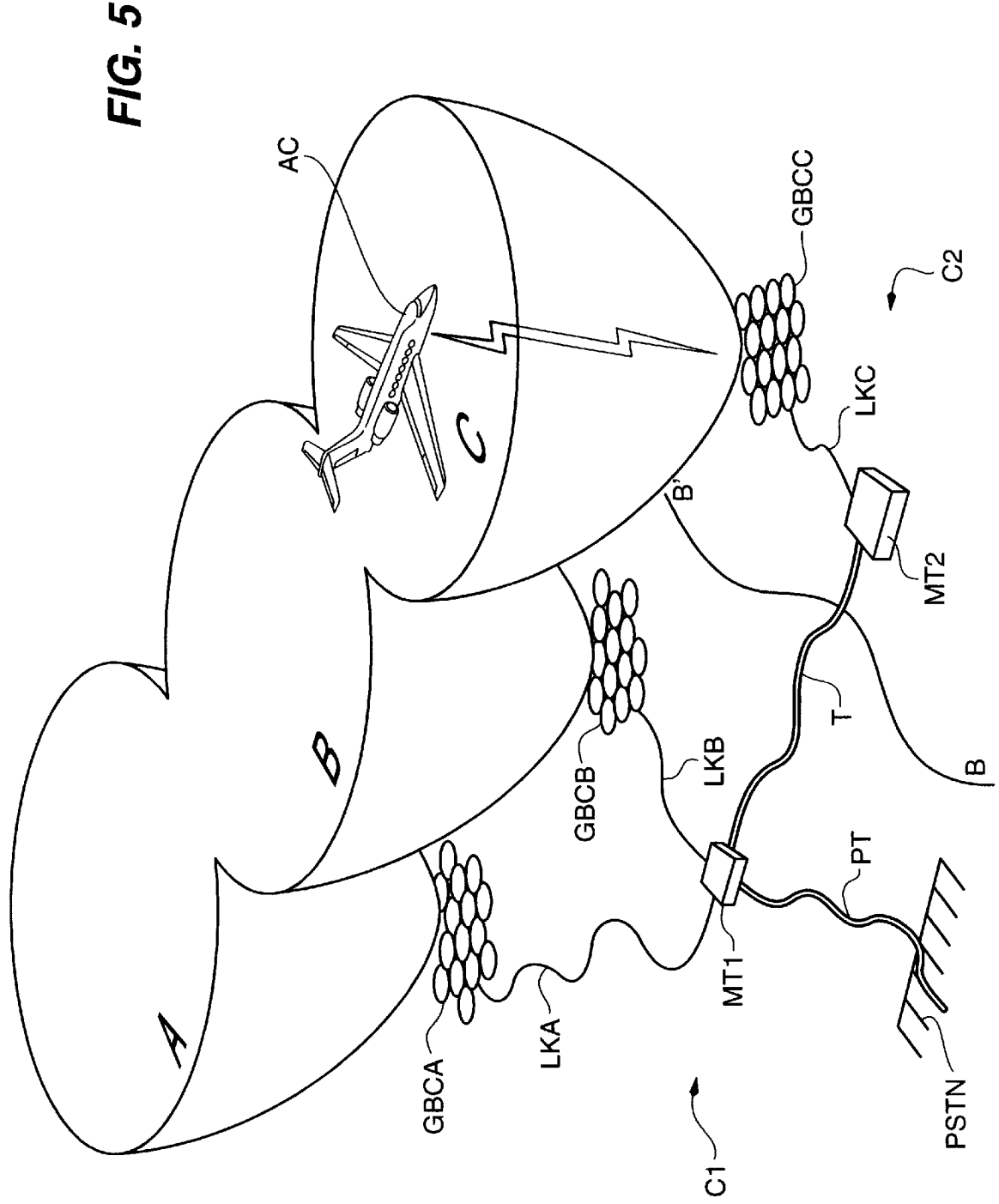
Figure 6:
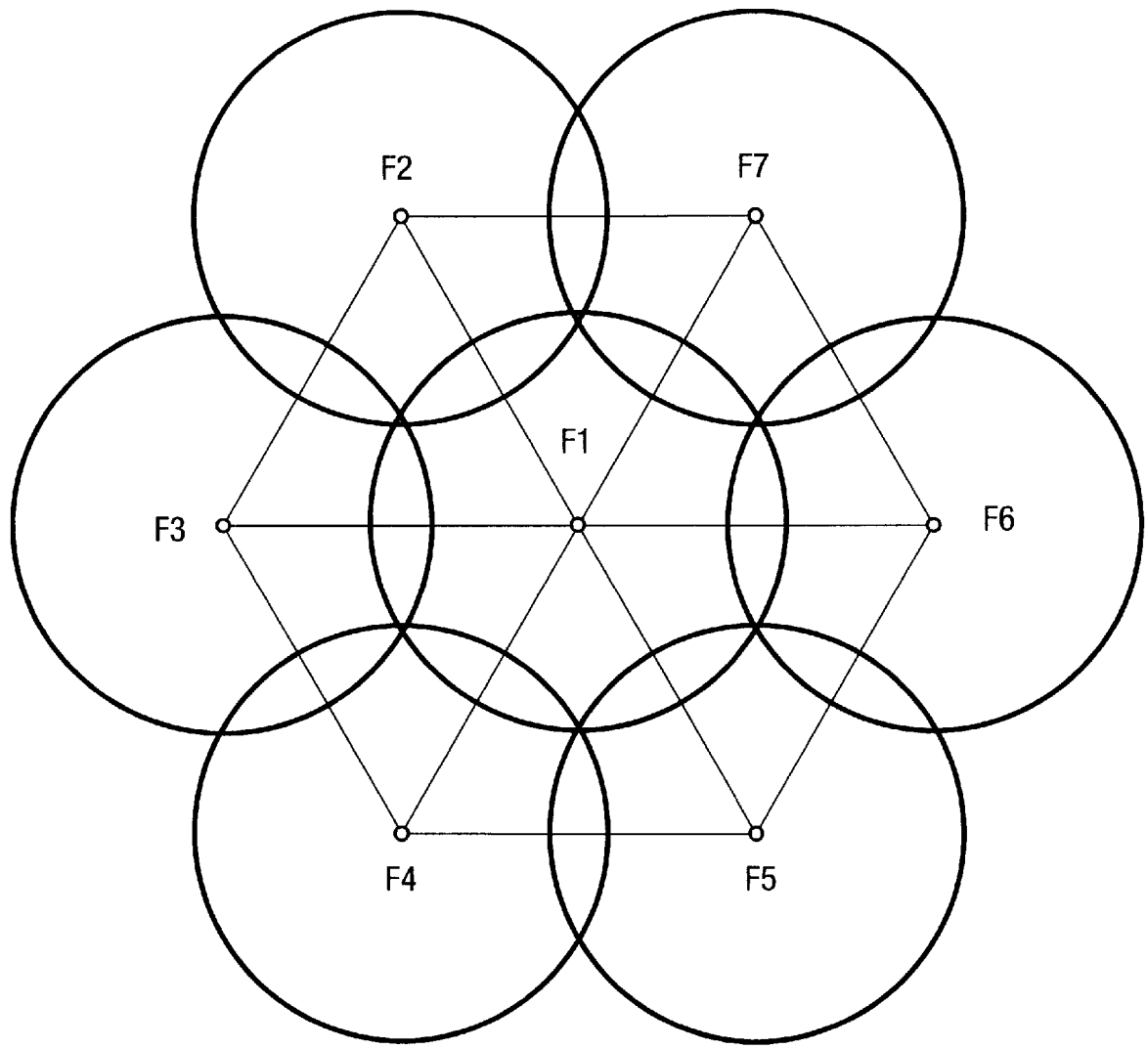
FIG. 6 illustrates a diagram of a typical non-terrestrial cell frequency reuse pattern.

In a multidimensional cellular mobile telecommunication system, a problem with the architecture illustrated in FIG. 2 is that the frequencies allocated for cellular mobile telecommunications for ground-based mobile subscriber stations are the same as those allocated for non-terrestrial mobile subscriber stations. The selection of broadcast frequencies for the plurality of ground-based cells is ordered to ensure that there is never an occurrence of adjacent cells broadcasting on the same frequency. There is an industry standard pattern of frequency allocation for cells and this industry standard pattern does not encompass non-terrestrial cells. A complicating factor is that a non-terrestrial cell has an extent significantly greater than a ground-based cell. In particular, the ground-based cells make use of antennas mounted on a tower which is located at a site which provides typically the greatest elevation in the cell so that the broadcast pattern of the antenna covers the greatest possible area. Given that the ground-based cell site transmitter is broadcasting toward the ground from its physical location, the extent of the cell is limited by the elevation of the antenna and any intervening physical signal obscuring features in the cell, such as buildings, mountains or the like. This limitation is generally not present for non-terrestrial antennas which broadcast in a skyward direction and do not have a limited broadcast range in terms of intervening features. FIGS. 3–5 illustrate a perspective view (not to scale) of the relative geographical extent of the ground-based cells and three typical non-terrestrial cells A–C. The non-terrestrial cell site antenna pattern is typically substantially parabolic in shape (for example the truncated paraboloid shown in FIG. 3) and covers a line of sight range from the siting of the antenna to the physical horizon. Therefore, the antenna pattern for the non-terrestrial cell covers a significantly greater area than a typical ground-based cell. Thus, a non-terrestrial cell typically covers tens or even hundreds of ground-based cells and is adjacent to ground-based cells that broadcast at every one of the presently allocated frequencies for cellular mobile telecommunications. Thus, by the very nature of this overlap, the non-terrestrial cell has a broadcast frequency which matches that of at least one of the juxtaposed ground-based cells. Furthermore, the frequency reuse pattern for non-terrestrial cells must be such that adjacent non-terrestrial cells do not use the same broadcast frequency. FIG. 6 illustrates a typical K=7 frequency reuse pattern for non-terrestrial cells where frequencies F1–F7 are used to provide complete coverage. The extent of each non-terrestrial cell enables the frequency reuse pattern to be simpler than that used for ground-based cells. Since the frequency reuse pattern requires only a small subset of the presently allocated frequencies, the reuse pattern can be used to create a cell within a cell. The traffic handling capacity of a particular non-terrestrial cell can therefore be doubled by simply allocating twice the frequencies for this cell, creating two cells having substantially the same physical extent. In addition, the carrier can use both the A and B sides of the band, and/or the frequency reuse pattern can be compressed from the traditional K=7 to K=3 to thereby create more cells. Thus, there is far greater flexibility in the non-terrestrial cells than in the corresponding ground-based cells in terms of cell implementation and management as is evidenced in additional detail by the following description of the system.

In order for the non-terrestrial cells to make use of the frequencies that are allocated for the ground-based mobile telecommunication cells, there must be some method of ensuring that the signals broadcast to and from the non-terrestrial mobile subscriber stations do not interfere with the existing communications in the ground-based cells and their ground-based mobile subscriber stations. To eliminate interference between non-terrestrial communications and ground-based communications for mobile cellular customers, the transmit and receive antenna patterns are architected to reduce the overlap in their area of coverage, as noted above. In addition, the polarization of the non-terrestrial transmissions are selected to be substantially orthogonal to the polarization of the ground-based transmissions. Alternatively, the non-terrestrial cellular telecommunication system can switch the uplink and downlink frequencies to be the opposite of the ground-based mobile subscriber station pattern. The presently used forward link can be used as the reverse link and the presently used reverse link can be used as the forward link in the non-terrestrial mobile subscriber station application. The transmitter power for the non-terrestrial mobile subscriber stations is significantly reduced over that used by ground-based mobile subscriber stations. A further element comprises the use of NAMPS carrier signals (10 kHz) which are centered in the interstitial region between adjacent AMPS carrier frequencies (30 kHz) that are used by the ground-based cellular mobile telecommunication system to obtain further gains in isolation (on the order of 7–15 dB). A final element of the implementation that prevents communication overlap is the use of dedicated control channels for the non-terrestrial communications, which control channels are not recognized by the ground-based communications. These factors individually and in various combinations enable the non-terrestrial communications to operate on frequencies that are used for ground-based communications where the non-terrestrial cells overlap the ground-based cells using the same transmit and receive frequencies. Other design factors of the same genre are possible and can include shifting the transmit and receive frequencies to be located between the existing predefined frequencies, and the like.

In operation, the multidimensional cellular mobile telecommunication system can comprise a separate non-terrestrial cellular mobile telecommunication system which can be integrated with the existing ground-based cellular mobile telecommunication system via a well defined interface. FIGS. 3–5 illustrate the operation of the multidimensional cellular mobile telecommunication system in a typical call processing situation. In FIG. 3, the non-terrestrial mobile subscriber station comprises an aircraft AC which is located in non-terrestrial cell A, which non-terrestrial cell overlays a plurality of ground-based cells GBCA. Two additional non-terrestrial cells B, C are also shown, each of which overlays another plurality of ground-based cells GBCB, GBCC, respectively. The three non-terrestrial cells A–C are shown as being oriented adjacent to each other, with cell B being between cells A and C. It is typical that other non-terrestrial cells would be implemented adjacent to cells A–C to provide complete coverage of the non-terrestrial space that extends above the ground shown in FIGS. 3–5. For simplicity of description, only three non-terrestrial cells A–C are shown in these figures. The existing ground-based cells are each connected via trunks LKA––LKC to an associated mobile telecommunication switching office MT1, MT2, which are themselves connected together via trunk T and to public switched telephone network PSTN via trunks PT. In this environment, it is typical that two different providers are serving the network, with a first company serving region C1 and a second company serving region C2, with the dividing line between the two service areas being shown in the figures by the dashed line B–B'. In this system environment, a call is established from a subscriber located in the aircraft AC, using a mobile subscriber station apparatus located in the aircraft AC in the well known manner of the existing ground-based cellular systems. The control signals from the mobile subscriber station apparatus located in the aircraft AC are transmitted to the cell site transmitter-receiver pair of non-terrestrial cell A, which is served by the first cellular company which provides service in region C1. The call is connected via trunk LKA to the mobile telecommunication switching office MT1, which interconnects the call connection to the public switched telephone network PSTN via trunk PT, in well known fashion. The call connection is then extended to the designated subscriber (not shown) which is assumed for this description to be located at a "land line" station. The allocation of frequencies and the subscriber identification for aircraft AC is managed via the non-terrestrial cell site control software which operates independent of the ground-based cellular network and which can be operational in the mobile telecommunication switching office MT1 which serves the non-terrestrial cell site for non-terrestrial cell A.

The diagram of FIG. 4 illustrates the instance of the aircraft AC traversing the boundary of non-terrestrial cell A into the extent of non-terrestrial cell B. Since non-terrestrial cell B is also supported by the first provider in service region Cl, the handoff between adjacent non-terrestrial cells can be accomplished in the traditional manner, with the mobile telecommunication switching office MT1 selecting one of the non-terrestrial cells surrounding the non-terrestrial cell in which the non-terrestrial subscriber station (aircraft AC) is presently active (non-terrestrial cell A) and provides the signal of greatest magnitude, and is therefore the candidate for handoff. The call connection is identified as a non-terrestrial call and is therefore managed by mobile telecommunication switching office MT1 as disjunct from the ground-based calls and the handoff to non-terrestrial cell B is processed in well known fashion with the mobile telecommunication switching office MT1 managing the non-terrestrial cells surrounding cell A as a virtual network, which is disjunct from the ground-based mobile cellular telecommunication network of GBCA and GBCB. Thus, the call connection to the aircraft AC via link LKA is transferred to link LKB as the frequency pair for communication with the aircraft AC is simultaneously switched to match that of the new cell, non-terrestrial cell B.

The diagram of FIG. 5 illustrates the instance of the aircraft AC traversing the boundary of non-terrestrial cell B into the extent of non-terrestrial cell C. Since non-terrestrial cell C is not supported by the first provider in service region Cl, the handoff between adjacent non-terrestrial cells is still accomplished in the traditional manner, with the mobile telecommunication switching office MT1 ascertaining which of the non-terrestrial cells surrounding the non-terrestrial cell in which the non-terrestrial subscriber station (aircraft AC) provides the signal of greatest magnitude, and is therefore the candidate for handoff. The call connection is identified as a non-terrestrial call and is therefore managed by mobile telecommunication switching office MT1 as disjunct from the ground-based calls and the handoff to non-terrestrial cell C is managed in well known fashion. In particular, the call connection is switched from mobile telecommunication switching office MT1 to mobile telecommunication switching office MT2 concurrent with the radio frequency handoff between the adjacent non-terrestrial cells B and C and the link to the public switched telephone network PSTN is maintained via trunk T so that there is no interruption in the call connection. This transition is typically managed by industry standard protocol such as SS7 and IS41B. Thus, aircraft AC switches the frequency pair for communication with the non-terrestrial cell C simultaneously with the ground-based link being switched to a communication path comprising link LKC to mobile telecommunication switching office MT2, trunk T, mobile telecommunication switching office MT1, and trunk PT to the public switched telecommunication network PSTN.

Non-Terrestrial Cell Configuration

The non-terrestrial cell typically shares a locus with a ground-based cell for efficiency purposes and produces an antenna pattern that is juxtaposed to the ground-based cell site antenna pattern and relatively non-overlapping so that transmissions are directed to non-terrestrial mobile subscriber stations rather than including ground-based mobile subscriber stations in the antenna pattern. The non-terrestrial cells can optionally each have a unique HLR and SID designation to distinguish them from the ground-based cells and to enable them to be managed in call origination, establishment and handoff functions. Furthermore, the carrier frequencies used for the non-terrestrial cell that is collocated with the ground-based cell are selected to be different to reduce the possibility of interference in the call coverage area of the antenna site.

Figure 7:
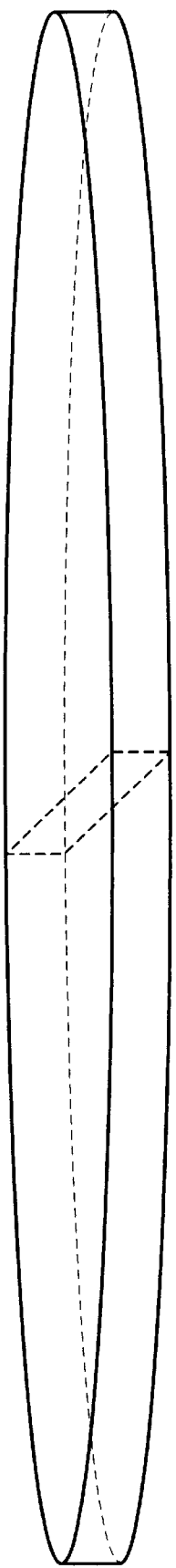
FIG. 7 illustrates a sectored non-terrestrial cell with a substantially cylindrical antenna pattern configuration.
Figure 8:
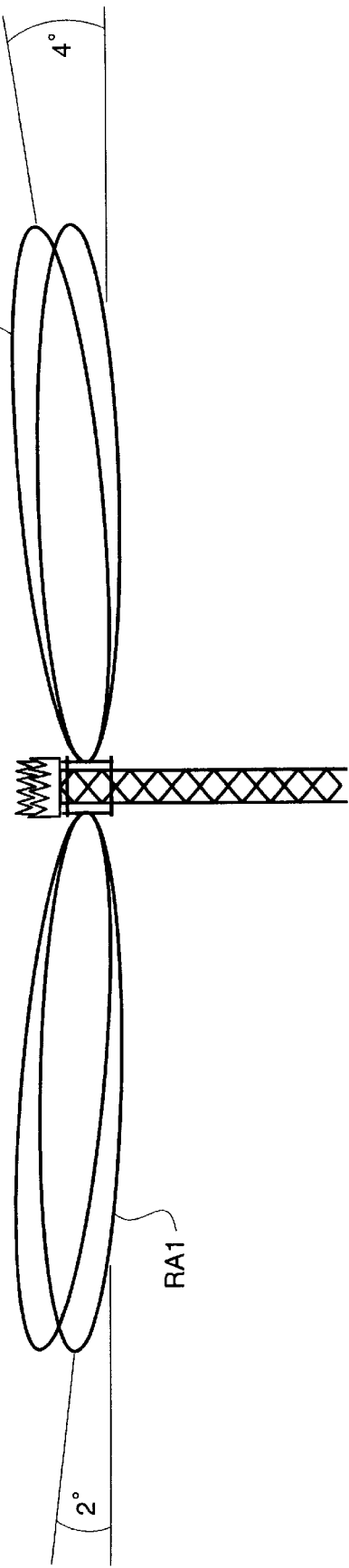
FIG. 8 illustrates a sectored non-terrestrial cell with a substantially toroidal antenna pattern configuration which includes a cylindrical antenna pattern configuration nested within the aperture of the toroid.

The non-terrestrial cell site antenna pattern can encompass a single beam element or multiple beam elements, depending on the implementation of the various antenna elements and several variations of the antenna pattern are disclosed herein. A simple single cell site pattern can comprise a substantially cylindrical or paraboloid pattern which extends radially out from the antenna in all directions above a plane substantially coplanar to the Earth's surface and at an elevation corresponding to the antenna mounting on the mast. This antenna pattern encompasses all of the volume of space located within line of sight of the antenna site, as is shown in FIG. 3. Alternatively, the antenna pattern can be divided into beams which can be a plurality of segments for use as subcells or independent cells within the area noted above. In particular, it may be beneficial to bifurcate the cylindrical area into two segments along a vertically oriented plane which is aligned with a diameter of the circle which comprises the bottom base of the cell, as shown in FIG. 7. This antenna pattern enables the non-terrestrial cellular mobile telecommunication system to manage communications in one half of the cell independent of the other half of the cell. This pattern also enables the antenna characteristics to be optimized for the respective directions of transmission which may provide efficiency in obtaining a more uniform antenna pattern for each of the two smaller regions of coverage. Another possible pattern of coverage for the non-terrestrial antennas is illustrated in FIG. 8 with the creation of a substantially toroidal antenna pattern with a second pattern occupying a central hole in the toroid and extending upward in a substantially conical manner. These two antenna patterns can be managed as a single cell or can comprise two separate and independent cells. Alternatively, the toroidal section can be divided into two or more segments and managed as separate cell elements. Thus, it is evident from this description, that the non-terrestrial cells have greater flexibility of implementation than the ground-based cells and comprise at least one cell within a predetermined three-dimensional volume of space. Thus, the control software can implement a soft or hard handoff within a single cell, and a hard handoff between adjacent non-terrestrial cells. The hard handoffs switch frequencies while the soft handoffs do not, and in the hard handoff, it is determined by the mobile telephone switching office while the soft handoff is determined by the cell site controller or diversity receiver.

Multidimensional Cellular Antenna Characteristics

The antenna located on a ground-based mobile subscriber station, such as an automobile, truck or boat, is vertically polarized and the antenna located on the ground-based station is likewise vertically polarized to provide more efficient coupling between the antennas. A different polarization between these antennas would have a marked effect on the effectiveness of the transmissions between the antennas. The ground-based antenna is mounted as high as practical since the coverage is a function of antenna elevation. The non-terrestrial antenna points skyward and therefore mounting height is far less relevant. The non-terrestrial antenna can be mounted below the ground-based antenna as shown in FIG. 2 or above the ground-based antenna. Non-terrestrial subscriber stations, such as aircraft, receive noise signals from ground-based sources, while in the reverse signal direction, the non-terrestrial cell site receiver does not receive signals from many noise sources since the only active sources of radio signals in the non-terrestrial region are the non-terrestrial subscriber stations. As noted above, the polarization of the non-terrestrial antenna elements should be substantially orthogonal to the polarization of the ground-based antenna elements. Therefore, the non-terrestrial antenna elements are horizontally polarized. The tower on which the antenna elements are mounted is largely transparent to the horizontally polarized non-terrestrial antenna radio frequency transmissions since the polarization of the signals is horizontal in nature and the tower is vertically oriented. In addition, the tower braces are diagonal in their orientation and therefore do not represent a substantial source of signal blockage.

Figure 9A:
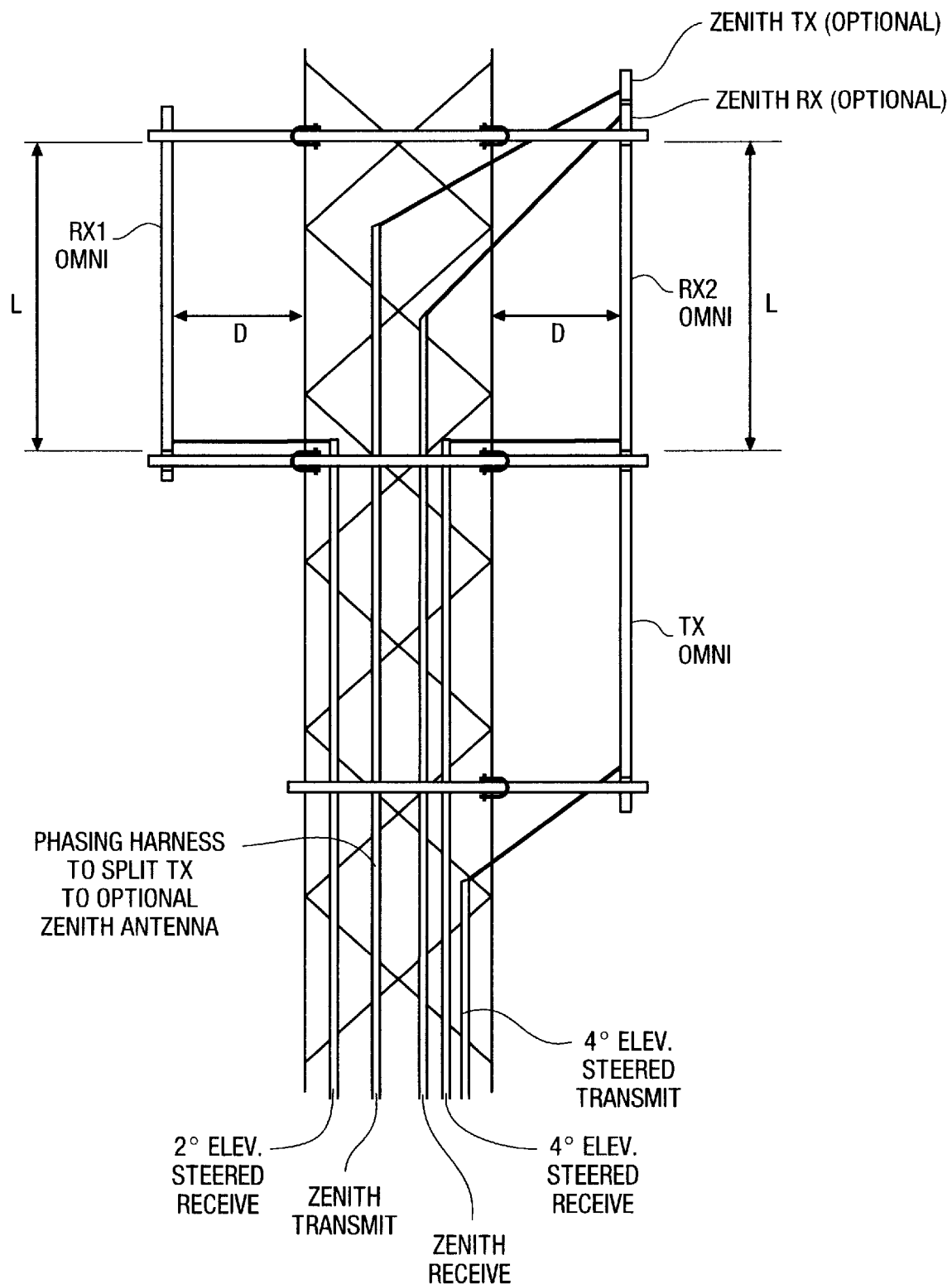
FIGS. 9A–C illustrate typical non-terrestrial cellular antenna mounting arrangements and antenna patterns.

One preferred implementation of the non-terrestrial antenna elements is shown in FIG. 9A and comprise two slotted waveguide antenna elements with an optional associated zenithally oriented antenna element for both the receive antenna elements as well as the transmit antenna elements. The slotted waveguide antenna elements produce a receive antenna pattern comprising two segments RA1, RA2 as illustrated in FIG. 8. The receive antenna is divided into a first element RX1 which produces an antenna pattern RA1 that has a predetermined ($2°$) electrical uptilt above the horizontal and a second element RX2 which produces an antenna pattern RA2 that has a predetermined ($4°$) electrical uptilt above the horizontal. Individually, these two antenna elements RX1, RX2 produce signal outputs indicative of the cellular radio signals received from non-terrestrial mobile subscriber stations that are operational within the associated non-terrestrial cell. These signals are typically processed by a corresponding receiver and the stronger of two outputs (if two outputs are produced) for a particular received signal from a selected non-terrestrial mobile subscriber station is used for the call connection. The transmit antenna element TX produces an antenna pattern, substantially corresponding to RA2, that has a predetermined (4°) electrical uptilt above the horizontal. The beam uptilt on both the receive and transmit antenna patterns dramatically reduces the magnitude of the multipath fades and also reduces the possibility that the signals can interfere with or be interfered by ground-based mobile subscriber stations.

The zenithally oriented antenna element can be any of a number of typical antenna elements, including, but not limited to: dipole, folded dipole, helix, Yagi and the like. The helix antenna provides a benefit in that the antenna pattern produced by such an element is circularly polarized in the horizontal plane and therefore is relatively insensitive to the direction of movement of the non-terrestrial mobile subscriber station as the non-terrestrial mobile subscriber station traverses the area near to and above the antenna. In the implementation illustrated in FIG. 9A, for the cellular radio frequencies, the slotted waveguide antenna element is preferably mounted on to the existing antenna tower which is used to support the antenna for ground-based cells. As shown in FIG. 9A, the antenna elements are mounted a sufficient distance D from the tower to reduce signal blockage from the tower structure.

A slotted waveguide antenna consists of a length L of waveguide that is constructed to implement a multi-element antenna which produces a focused receive pattern. Typically, the receive pattern of the slotted waveguide antenna is formed to receive signals from only a segment of space (controlled field of view), with the precise receive pattern being created by management of the size, location and geometry of the slots cut into the waveguide. A slot cut into the waveguide wall is connected to the conductors of a twin line feed, placed in the interior of the slotted waveguide. The waveguide slots emit power received from the twin line feed into free space. The spacing and/or orientation of the slots along the edge of the waveguide are used in order to control aperture illumination. The slotted waveguide antenna can be mechanically tilted or the produced antenna pattern electrically steered to provide a predetermined amount of uptilt to the antenna pattern, which uptilt reduces the production of multi-path interference signals as described below.

In the embodiment disclosed herein, the shaped beam pattern encompasses the volume of space located above and radially around the antenna elements which are mounted on the antenna tower. The antenna can comprise either a single, or multiple antenna elements, which are designed to produce a receive characteristic pattern which provides substantially uniform coverage for the entire non-terrestrial cell. In particular, the antenna pattern covers the region of space above an antenna horizon, which antenna horizon extends radially from the antenna mast to the physical horizon, and at the elevation which substantially corresponds to the antenna element mounting height on the antenna tower. As a practical implementation, the antenna is mounted with a slight (typically 4°) uptilt to minimize the production of multi-path signals. The antenna criteria are also: a horizontally polarized beam to match the non-terrestrial mobile subscriber station transmitter signal polarization, and a beam pattern which exhibits a sharp reduction in gain for elevation angles below the antenna horizon.

Figure 11:
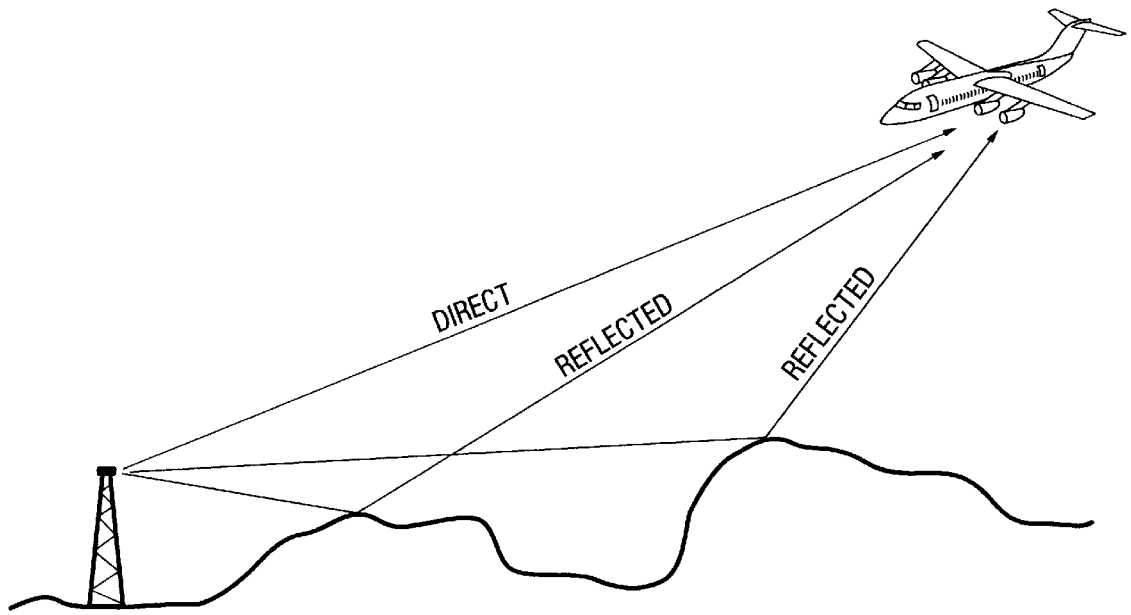
FIG. 11 illustrates the non-terrestrial cellular signal paths that are found in the multipath interference situation.

The reduction of the ground reflections of signals is important due to the multi-path phenomena. Multi-path is illustrated in FIG. 11 wherein the signals produced by a transmitting source reach the receiver over many different paths, including direct reception of the generated signals and multi-path reception of the generated signals due to reflections from the ground surface. When the path length of the various signal paths are integral wavelength multiples of the fundamental wavelength, this causes nulls which repeat in a fixed pattern as a function of radial distance from a cell site, thereby causing reduction in signal power at these points. The antenna uptilt used in the non-terrestrial antenna reduces these nulls by reducing the antenna pattern illumination of the ground.

Figure 9B:
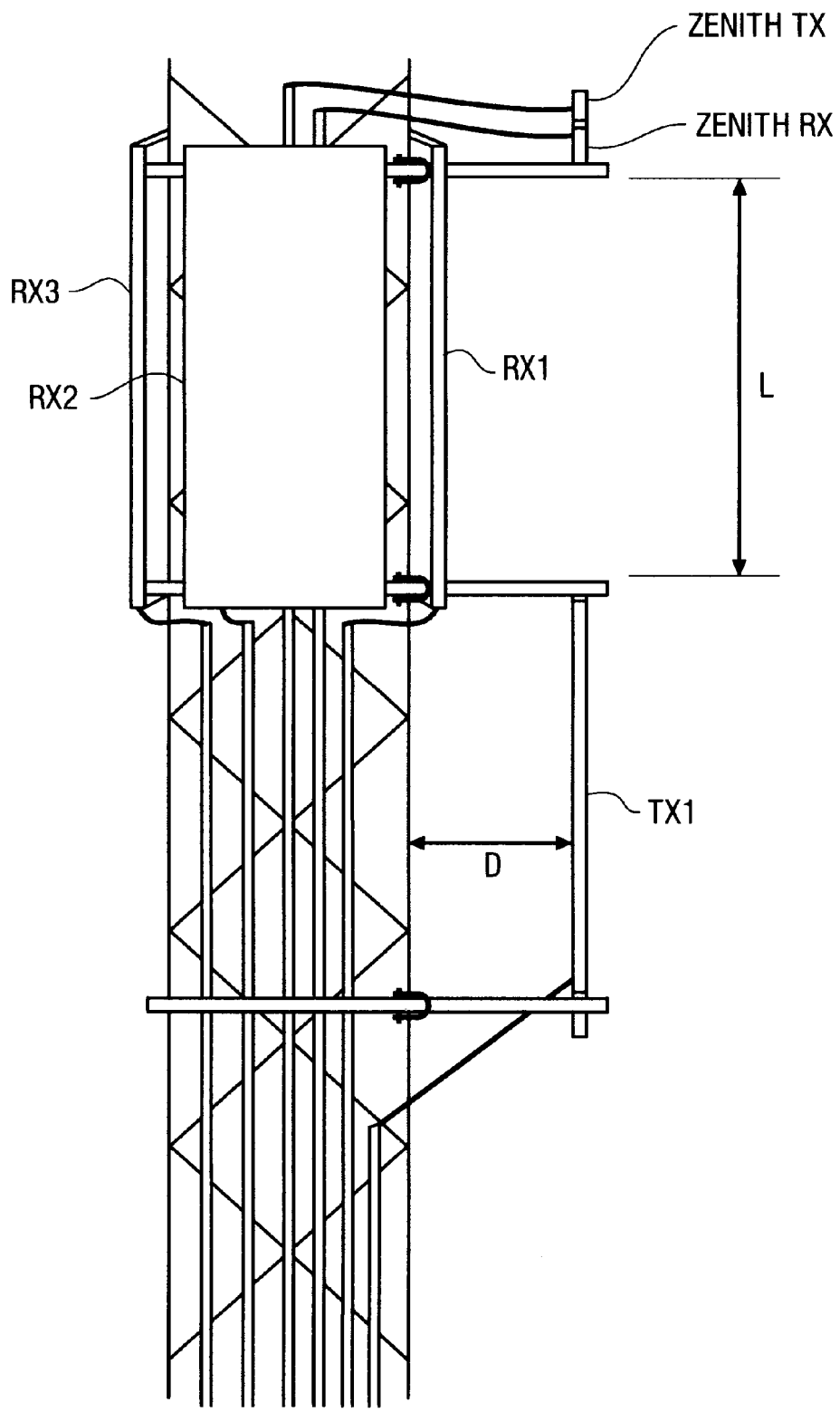
Figure 9C:
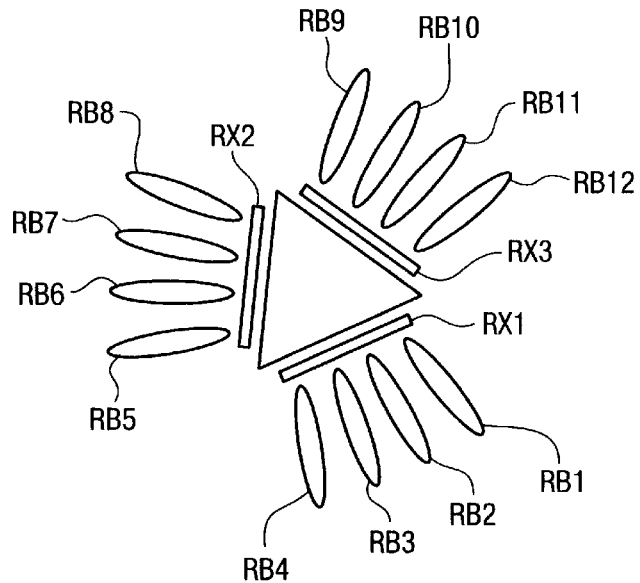

An alternative embodiment of the antenna is shown in FIG. 9B, with the resultant receive antenna pattern being shown in FIG. 9C. The transmit antenna TX1 is the same as shown in FIG. 9A, but the receive antenna comprises three multi-beam antenna elements RX1–RX3, each of which generates a plurality of receive beams. In the example shown, the antenna elements RX1, RX2, RX3 generate beams RB1–RB4, RB5–RB8, RB9–RB12, respectively. The collection of beams RB1–RB12 cover the entirety of the volume of space encompassed by the non-terrestrial cell, but each beam covers only a segment of this space. This antenna configuration requires less transmitter power from the non-terrestrial mobile subscriber station but is more expensive to implement on the tower. Each antenna element covers only a segment of the space, the power necessary to maintain a call connection is far less than for an antenna which covers the entirety of the space. The received set of twelve signal streams are switched through a switch matrix (not shown) to pass the two strongest signals for a particular non-terrestrial mobile subscriber stations to the two receivers noted above for processing as described above. The receive antenna elements can also typically have a predetermined (4°) electrical or mechanical uptilt above the horizontal.

Non-Terrestrial Mobile Subscriber Stations

In the above description of the multidimensional cellular communication system, the non-terrestrial subscribers are assumed for the purpose of the description to be resident in a small fixed wing aircraft. However, the nature of the mobile unit MU in which the mobile subscriber station MS (FIGS. 12A & 12B) is installed is not limited to this application. In particular, the mobile unit MU can be a lighter than air craft, a helicopter, or a commercial multi-passenger fixed wing aircraft, or the like. The only limiting factor is that the mobile unit MU is operational in the non-terrestrial cells rather than the ground-based cells when a communication connection is established.

A specific exception to this general rule is that a "ground-based" cell in the non-terrestrial network can be established at, for example, an airport location to serve the aircraft located on the ground prior to the aircraft taking off and entering the non-terrestrial cell extant in the region of space above the airport. This ground-based cell is part of the non-terrestrial network and operates via the conventional ground-based cellular mobile communications technology, but can operate on a low power basis, since the transmit range can be limited to the bounds of the airport, thereby avoiding interference with the adjacent non-terrestrial and ground-based cells. The mobile unit MU can contain mobile unit location apparatus WW to identify whether the non-terrestrial mobile subscriber station MS should be served by the non-terrestrial cell or the ground-based cell. The mobile unit location apparatus WW produces an indication of whether the mobile unit MU is aloft and the control circuit C automatically switches between the non-terrestrial cell and the ground-based cell located at the airport by activating the appropriate radio apparatus to initiate a communication connection. To achieve the automatic transition, the mobile unit MU can be equipped with both a non-terrestrial mobile subscriber station radio apparatus NTR as well as a ground-based mobile subscriber station radio apparatus GBR. The mobile unit MU can switch between the non-terrestrial and ground-based systems in response to the pilot's activation of the aircraft landing gear, or the "weight on wheels" condition when the aircraft touches down, as determined by the mobile unit location apparatus WW. The partitioned switch can signal the serving non-terrestrial cell site that a hard handoff is requested to the resident "ground-based" non-terrestrial cell, as is well known in the cellular communications technology. The existing call can then be transparently switched between the serving systems without interrupting the existing call.

There are a number of possible implementations of the above-noted ground-based cell. The ground-based cell can be a non-terrestrial cell having the characteristics of the above-noted non-terrestrial cells but sited at ground level to serve the aircraft while they are on the ground. The handoff between this ground-based non-terrestrial cell and the non-terrestrial cell that overlies this area is simply a handoff between two adjacent non-terrestrial cells. Alternatively, the ground-based cell can be a traditional ground-based cellular mobile telecommunication cell and the handoff between this cell and the non-terrestrial cell that overlies this area is a handoff between two different networks, or two different partitions on the network. These differences are noted above and are not repeated here for the sake of brevity. In addition, the implementation of the non-terrestrial mobile subscriber station MS can comprise separate ground-based subscriber station radio apparatus GBR and non-terrestrial subscriber station radio apparatus NTR, or this apparatus can be integrated into a single physical unit with software control of the transitions between the non-terrestrial and ground-based modes.

The non-terrestrial mobile subscriber station MS located in the mobile unit MU is shown as including both non-terrestrial and ground-based communication apparatus. In implementation, this equipment can comprise a conventional stand-alone ground-based mobile subscriber station which is connected to a separate non-terrestrial mobile subscriber station, since the ground-based apparatus is optional, although the integrated unit is illustrated herein for the purpose of this description. The non-terrestrial mobile subscriber station MS is typically equipped with a non-terrestrial mobile subscriber station radio apparatus NTR and a ground-based mobile subscriber station radio apparatus GBR, each of which includes the transmitter TRANS and receiver RCVR circuits well known in cellular communications. The apparatus also includes a non-terrestrial antenna HPA (horizontally polarized) and a ground-based antenna VPA (vertically polarized), which are typically mounted on an exterior surface of the mobile unit MU. The antenna mounting can be directly fixed to the mobile unit MU or can be located in a separate unit which is mounted on the exterior surface of the mobile unit MU. In this latter case, the non-terrestrial antenna HPA can be mechanically steered so that the radiation pattern of the antenna elements can be aligned with the cell site transmitter and receiver antennas to thereby enhance the quality of the communication therebetween. Alternatively, the non-terrestrial antenna HPA can be electronically steered by adjusting the phase and/or magnitude of the signals applied to the antenna elements of an array as is well known in this technology. The power output of the non-terrestrial transmitter TRANS can also be regulated as a function of the distance from the cell site transmitter antenna to ensure a relatively constant signal level, using the Dynamic Power Control circuit presently available in many cellular radio systems.

Furthermore, the non-terrestrial mobile subscriber station MS may be used to serve a single handset unit H or can be multiplexed through the multiplexer MUX to serve a plurality of handset (and/or headset) units H, H', H" as in a commercial airliner application. The handsets H, H', H" can be hard wired to the non-terrestrial mobile subscriber station MS or can be wireless handset units H' of limited communication range which interconnect with the non-terrestrial mobile subscriber station MS via radio frequency transmissions. In the multi-user application, the non-terrestrial mobile subscriber station MS can comprise a "mini-cell" wherein the various handsets H, H', H" are managed by the non-terrestrial mobile subscriber station MS in a manner analogous to that performed by the typical cell site/MTSO. Thus, the handset units H, H', H" can be of a different technology than the single handset applications, with the non-terrestrial mobile subscriber station MS performing an integration function as well as the call multiplexing function. The handsets H, H', H" can be personal communication system (PCS) units, pagers, code division multiple access (CDMA) units, or any other wireless communication devices which are in use by individuals. The non-terrestrial mobile subscriber station MS receives the signals generated by the various handset units H, H', H" and formats (if necessary) the data contained in these transmissions into the format used for the radio link transmissions to the cell site. The resultant signal is applied via the transmitter T contained in the non-terrestrial radio apparatus NTR to the antenna HPA mounted on the exterior of the mobile unit MU, which radiates the signals to the serving cell site.

The communications in the reverse direction are managed in a complementary manner as is well known. The handset units H, H', H" each have a unique identification which enables the underlying cellular communication network to communicate with the unit. The non-terrestrial mobile subscriber station MS can therefore perform the handset registration function by polling the handset units H, H' extant in the space served by the non-terrestrial mobile subscriber station MS to thereby identify these units. This unit identification data can then be transmitted to the cell site via the cellular radio control channels to enable the cellular network to ascertain the location of these particular units. Thus, when a ground-based subscriber (for example) initiates a call to one of these handset units H, H' the MTSO can scan the mobile subscriber records to locate the identified mobile subscriber station. This data is then used by the cellular network to establish a communication link to the identified mobile subscriber unit MU. In this manner, what may traditionally may be considered ground-based mobile subscriber stations can function as non-terrestrial mobile subscriber stations in the environment just described.

Non-Terrestrial Mobile Subscriber Station—System Features

The present non-terrestrial mobile subscriber station MS incorporates a plurality of features that enable spectrum reuse, which features include:

Horizontal polarization of signal

Ultra-low airborne transmit power levels

Aircraft antenna patterns that minimize nadir (Earth directed) EIRP

Tightly controlled dynamic power control settings

Very low dynamic power control levels (much lower than ground cellular)

Ground-based cellular operates at much higher signal levels

Use of more lightly loaded EAMPS frequencies

Non-standard control channels

Base station frequency coordination

Base station antenna pattern isolation

Base station receive chain loss minimization

These features collectively create system level isolation in the radio frequency signaling path. This isolation enables frequency reuse and separates non-terrestrial cellular mobile communications from ground-based cellular mobile communications. The features are noted below:

The horizontal polarization of the signal feature was discussed above with respect to the underlying multidimensional cellular mobile telecommunication system, and comprises the selection of an antenna pattern that reduces the possibility of interacting with existing ground-based cellular mobile telecommunications systems. The polarity orthogonality of the two sets of signals reduces the coupling therebetween.

The ultra-low airborne transmit power levels feature represents a control by POWER CONTROL circuit of the output signal power produced by the non-terrestrial mobile subscriber station MS to minimize the likelihood of receipt of the non-terrestrial cellular signal by ground-based cell sites or subscriber stations. The power level of the signal transmitted by the non-terrestrial mobile subscriber station MS is typically 5.5 milli-watts for the antenna of FIG. 9A and less than 500 microwatts using the antenna of FIG. 9B at lower altitudes (up to 5,000 feet) and within 75 nautical miles of the base station. This magnitude output signal strength represents a significant departure from the standard ground-based cellular signal strength, and the non-terrestrial cellular signals are therefore typically rejected by the ground-based cell sites and subscriber stations. The non-terrestrial mobile subscriber station apparatus NTR can include an attenuator PAD which serves to reduce the power output of the transmitter TRANS so that a reduced output level is maintained. The duplexor circuits function, in well-known fashion to interconnect the transmitter and receiver circuits to the antenna HPA, with the transmit and receive paths between the two duplexors being differentiated by the presence of the attenuator PAD in the transmit path. Thus, the use of the attenuator PAD to connect the antenna HPA enables the use of conventional transmitter TRANS and receiver RCV circuits without having to modify their operation to account for the reduced power output levels used in non-terrestrial cells. Alternatively, a custom designed "NTR" could include directly shifted power levels removing the need for the duplexors and PAD.

Aircraft antenna patterns that minimize nadir (Earth directed) effective radiated power (ERP) are used in the implementation of the antenna(s) on the mobile unit. Two commonly used antenna types are a belly mounted blade and a vertical stabilizer mounted blade antenna. The belly mounted blade antenna uses a vertical slot in which the E-Field is horizontally polarized. This slot antenna has a pattern which is the complement to a dipole arranged in a vertical plane but has orthogonal polarization. The pattern thereby exhibits a null toward the earth (nadir) which is the direction for minimal slant range and hence minimal propagation loss. The level of energy is greatly reduced due to this pattern shaping, but is still orthogonally polarized with respect to ground-based antenna patterns. The second antenna type is a horizontally mounted blade antenna deployed on either side of the vertical stabilizer. This antenna uses a dipole type of radiating element that is horizontally polarized. The horizontal stabilizer of the aircraft is mounted between this horizontally mounted blade antenna and the earth, thereby greatly reducing the power directed toward the earth (nadir).

The non-terrestrial mobile subscriber station MS operates with tightly controlled dynamic power control settings. The MTSO is programmed to have a very tight dynamic power control range, which power is set very low, as noted above. In the existing analog Advanced Mobile Phone System (AMPS), stations are regulated to a maximum allowed effective radiated power (ERP). In a similar manner, each non-terrestrial mobile subscriber station MS is commanded to a power level within a predetermined operating range. A typical set of power control levels in watts of output from the mobile transmitter are:

| Level | Power: Existing Systems | Power: Non-Terrestrial System |
|---|---|---|
| 0 | 4.0000 | 0.0700 |
| 1 | 1.6000 | 0.0280 |
| 2 | 0.6000 | 0.0110 |
| 3 | 0.2500 | 0.0040 |
| 4 | 0.1000 | 0.0018 |
| 5 | 0.0400 | 0.0007 |
| 6 | 0.0160 | 0.0003 |
| 7 | 0.0060 | 0.0001 |

In addition, the line-of-sight propagation of the non-terrestrial originated cellular signals causes minimal fading anomalies, since the fading is limited to energy reflecting off the earth surface where the terrain is flat. Fading is typically very slow in its periodicity and can be easily compensated for by the MTSO adjusting the output power level of the non-terrestrial mobile subscriber station.

A corollary to the above-noted restricted power output from the non-terrestrial mobile subscriber station is that the ground-based cellular operates at much higher signal levels. Therefore, handoffs in the ground-based cellular system occur at signal levels orders of magnitude greater than the operating levels of the non-terrestrial mobile subscriber stations. The presence of a cellular signal from a non-terrestrial mobile subscriber station is therefore ignored by the ground-based cellular mobile subscriber stations and their serving cell sites. Thus, a great deal of signal separation, hence no interference, is maintained between the two virtual networks.

Use of more lightly loaded EAMPS frequencies reduces interference between non-terrestrial mobile subscriber stations and ground-based base stations by separating the frequencies at which they operate. Where the non-terrestrial cell and one or more of the ground-based cells are on same frequency, the frequency used for the non-terrestrial cell is selected to correspond to a frequency that is light in traffic, for example—away from a metropolitan area.

As noted above, the non-terrestrial mobile subscriber station MS uses non-standard control channels so that the ground-based cellular system and the non-terrestrial cellular system do not interfere.

Base station frequency is coordinated with the ground-based mobile cellular communication system to avoid the use of the same base station transmitter frequencies.

Base station antenna tilt is selected to reduce the multi-path power so that the steps in the power level are stable and incremented by a single predetermined step at a time as the non-terrestrial mobile subscriber station moves in a direction away from the base station. This process of precise power control maintains transmit quality by controlling power output.

Base station receiver loss minimization is used to separate the power levels of the non-terrestrial mobile subscriber station signals and those emanating from the ground-based cellular subscriber stations. Active amplifiers can be used in the non-terrestrial cell site to maintain a low noise floor, well below that of the ground-based system. With the exception of cable resistive losses, active amplifiers and active distribution are used to enable the use of low signal power from the non-terrestrial mobile subscriber station.

Thus, there are a plurality of factors that can be used individually or in combination to prevent interference between the non-terrestrial mobile subscriber station and the ground-based subscriber stations and their associated cell sites.

Non-Terrestrial Mobile Subscriber Station—CDMA System Features

In addition to the above-noted characteristics of the non-terrestrial mobile subscriber station, there is an alternative cellular communication system termed Code Division Multiple Access (CDMA) which transmits a plurality of communications on each channel and differentiates the various mobile subscriber stations by the code assigned to each mobile subscriber station. These systems transmit multiple conversations on the same frequency. In order to maintain the overall system noise level at a minimum, the power level of the various mobile subscriber stations must be precisely controlled. Furthermore, the large size of a non-terrestrial cell add to the power control problem, since the disparity in distances among the various non-terrestrial mobile subscriber stations cause significant diversity in the received power of the signals from these non-terrestrial mobile subscriber stations, which power level dynamically varies as the non-terrestrial mobile subscriber stations move about the cell. This means that a non-terrestrial station using the same code as a terrestrial station could cause unacceptable interference. With a typical CDMA system, 64 Walsh codes are used to differentiate among the mobile subscriber stations thus removing the described effect of the "near-far" problem, and a predetermined number of these codes can be reserved for the exclusive use by non-terrestrial mobile subscriber stations, since generally all of these codes not all are used in a typical ground-based cell site. Thus, the code separation in a CDMA system can be used to prevent the interference between non-terrestrial mobile subscriber stations and the ground-based subscriber stations and their cell sites. In conjunction with unique Walsh code assignments, the network can also assign unique "Wide Area" code words to identify a virtual network overlay.

Data Features of the Non-Terrestrial Mobile Subscriber Station

The inherent differences between the mobile unit used by subscribers in ground-based and non-terrestrial systems provides opportunities for enhanced capabilities in the non-terrestrial mobile subscriber station. In particular, the ground-based mobile unit is either a user carrying the mobile subscriber station or an automobile in which the mobile subscriber station is installed. In both instances, the need for additional services or features is limited. In contrast, the use of a non-terrestrial mobile subscriber station MS is typically in an aircraft MU, which has an existing set of communications needs which can be served, either uniquely or redundantly, by the non-terrestrial mobile subscriber station MS.

In particular, the communication needs associated with an aircraft include, but are not limited to, the classes of services noted herein:

Occupant data communications
Telemetry relay
Aircraft safety and maintenance
Pilot-Controller communications
Aircraft operations support Each of these categories represents an opportunity to use the inherent communications capabilities of the non-terrestrial mobile subscriber station MS in a transparent manner. The voice communications activity in a non-terrestrial mobile subscriber station MS is typically only a minimal use of the communication capacity of this equipment. Therefore, as shown in FIG. 12B, the non-terrestrial mobile subscriber station MS can be interconnected with a plurality of existing apparatus in the aircraft or with newly installed equipment to provide these services.

The data communication capability of the non-terrestrial subscriber station MS can be enhanced by increasing the bandwidth of the communication connection that is established with the cell site. There are a number of ways to provide an increased bandwidth, including allocating multiple communication channels to the data communication function. Thus, a single call connection for data communication purposes comprises multiple physical communication channels managed in parallel to thereby multiply the data communication capacity associated with a single channel in the system. Alternatively, dedicated data communication channels can be allocated in the defined communication space, with the data communication channels occupying the bandwidth of multiple voice communication channels. In wither case, the data communication capability of the non-terrestrial subscriber station MS can be adapted to suit the needs of the non-terrestrial vehicle and its operation.

Occupant Communications

A first example is the occupant data communications class of service wherein the aircraft occupants can interconnect a terminal device HT with the handset H to obtain additional communications capability. An example of this is the use of a personal computer, equipped with a modem, to the handset connection to thereby enable the user to transmit and receive data over the cellular voice communication connection, as is well known. The data can include facsimile transmissions, E-Mail, data files and the like. Additionally, the terminal device HT can include a video display and the data displayed thereon can be entertainment/informational programs that are retrieved from a program data storage system DS resident in the aircraft or uploaded from the cell site or a source connected to the non-terrestrial mobile subscriber station MS via a cellular communication connection. Additionally, the non-terrestrial mobile subscriber station MS can have a built-in modem MODEM for the provision of data communication functions to any user selected peripheral device (not shown) to extend the capabilities of this apparatus.

Telemetry Data Collection

As the aircraft flight path is traversed, the non-terrestrial mobile subscriber station MS, or a second transceiver DPP (such as a spread spectrum transceiver) which is connected to the non-terrestrial mobile subscriber station MS, can function to retrieve data from ground sites, such as telemetry system TEL, via the use of a polling capability. In particular, there are numerous remotely located ground-based telemetry stations TEL which function to collect data, such as oil/gas well output data, stream flow data, meteorological data, and the like. The collection of this data is expensive since there typically is no existing communication infrastructure that serves these sites. The second transceiver DPP connected to the non-terrestrial mobile subscriber station MS can establish a communication connection to these ground-based telemetry stations TEL as the aircraft flies over these sites. Since the non-terrestrial mobile subscriber station MS is aircraft based, a line of sight communication capability from the second transceiver DPP covers a significant amount of ground area. The telemetry communication can be effected by automatically, or on a periodic basis, broadcasting a poll query via polling antenna PA in a downward direction. The ground-based telemetry stations TEL that are within communication range of the second transceiver DPP can respond to the poll, in well known fashion, to upload telemetry data to the non-terrestrial mobile subscriber station MS for storage in data storage memory MEMORY for later transmission to a data collection site or the data storage memory MEMORY can comprise a data storage medium, such as a magnetic tape, which is physically removed from the non-terrestrial mobile subscriber station MS for delivery to a data collection center. Alternatively, the control channel (or voice multiplexed with data) of the non-terrestrial mobile subscriber station MS can be used for data transmission during an existing voice communication call or the communication link can be automatically activated to originate a data transfer call when the non-terrestrial mobile subscriber station MS is not in use.

Figure 12A:
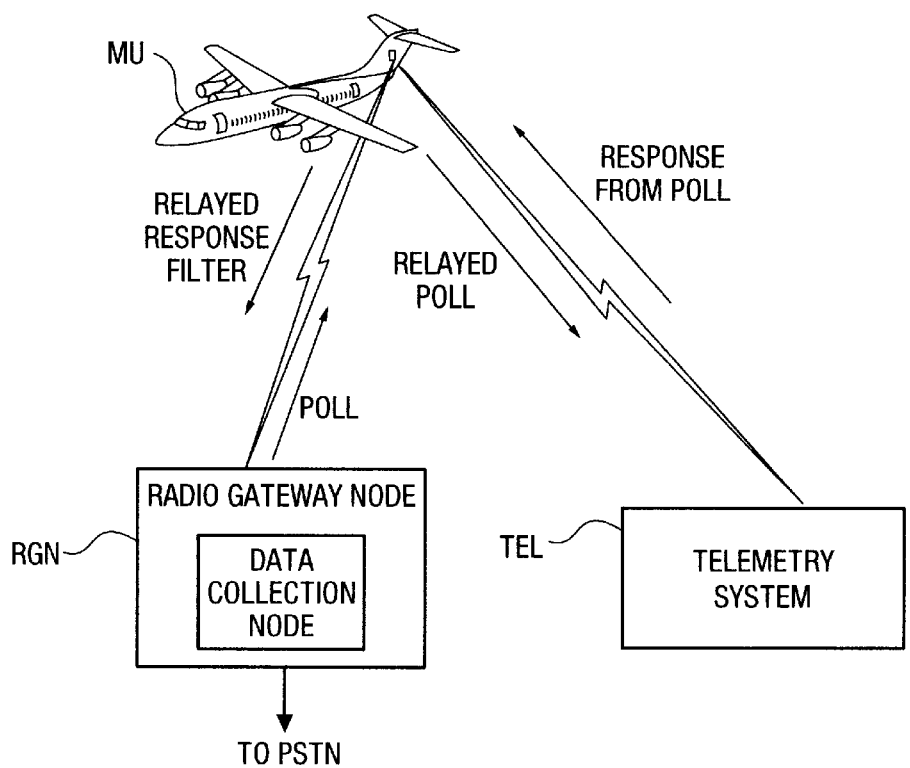
FIGS. 12A & 12B illustrate the architecture of the present non-terrestrial mobile subscriber station.
Figure 12B:
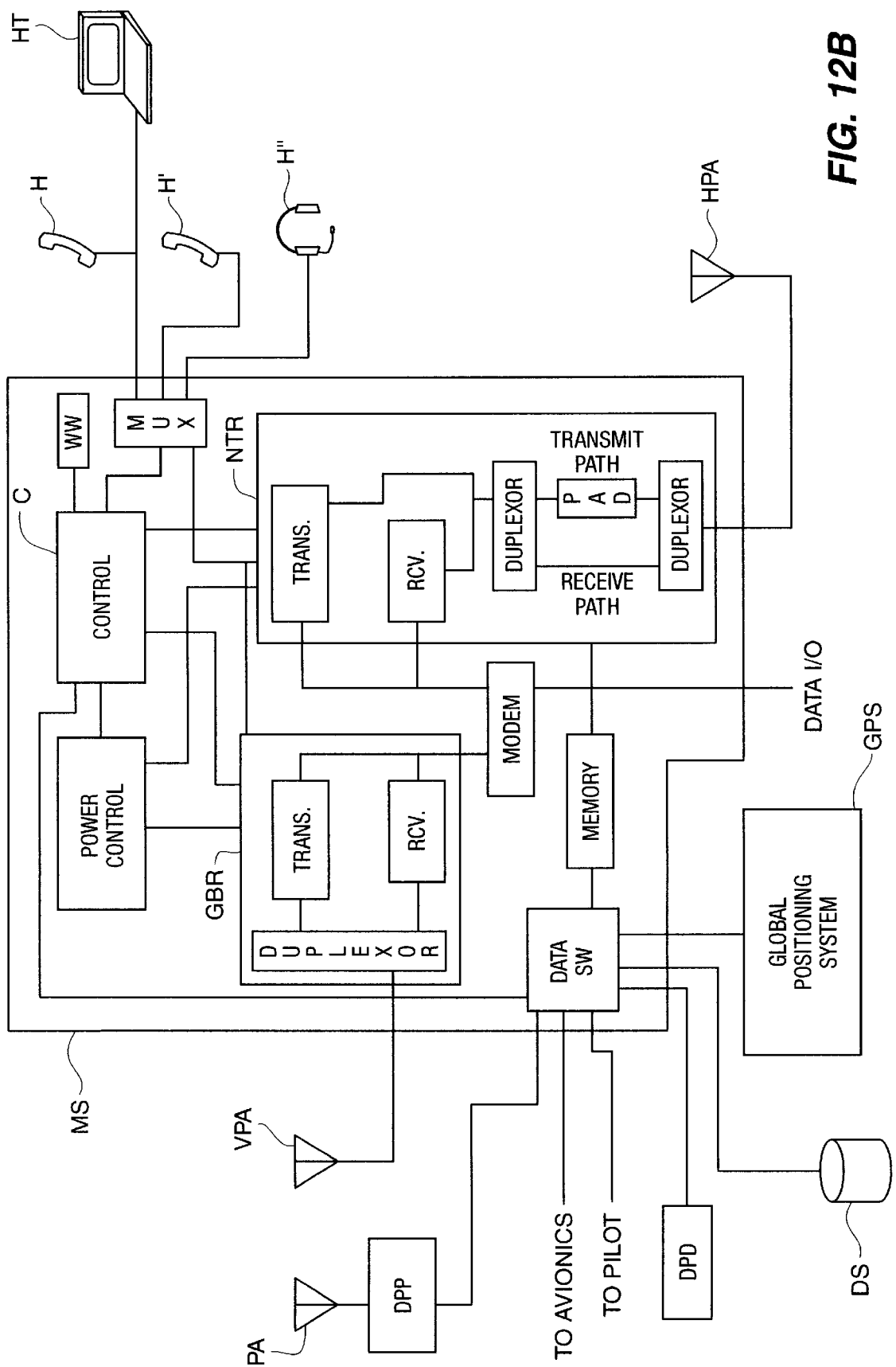

The diagram of FIG. 12A illustrates a typical application of the telemetry data collection function. A radio gateway node RGN is sited to collect data from a plurality of remotely located telemetry systems TEL. Each telemetry system TEL can be considered to be a remote node of a data collection system. For example, the radio gateway node RGN can be a ground-based wireless communication system located at a site where it is connected to the public switched telephone network PTSN to thereby enable the radio gateway node RGN to establish data communication connections with remotely located data processing equipment. The radio gateway node RGN collects data from a plurality of remotely located nodes, each comprising a telemetry system TEL by means of the non-terrestrial mobile subscriber station MS located in an aircraft that is engaged in an overflight of the region served by the radio gateway node RGN. The data collection function is initiated by the cooperative interaction between the radio gateway node RGN and the non-terrestrial mobile subscriber station MS to create a communication connection therebetween to initiate a data collection operation. The radio gateway node RGN transmits a poll to the non-terrestrial mobile subscriber station MS, which relays the received poll to the telemetry system TEL as noted above. The telemetry system TEL responds to this received poll by formatting the data stored in its memory pursuant to the appropriate protocol and transmitting this data to the non-terrestrial mobile subscriber station MS. The non-terrestrial mobile subscriber station MS simply relays the received data to the radio gateway node RGN, where it is stored in the data collection node contained therein for later processing and/or transmission to the data processing center. The polls transmitted by the radio gateway node RGN can be specifically addressed, as is well known, to a selected telemetry station TEL, so that the received response can be simply recorded and associated with the site at which the addressed telemetry station TEL is located.

Thus, the non-terrestrial mobile subscriber station MS can function as an ultra-low earth orbit repeater station for the ground-based telemetry stations TEL. Where the aircraft is equipped with a Global Positioning System (GPS), this apparatus can be used to precisely locate aircraft, and direction of travel, so that the polling of the ground-based telemetry stations can be selective, since the non-terrestrial mobile subscriber station can identify which ground-based telemetry stations are now in polling range of the aircraft.

Aircraft Safety And Maintenance

The non-terrestrial mobile subscriber station MS can also be connected to the avionics equipment resident in the aircraft to collect data relevant to the operation of the aircraft. The data can be collected and stored in the data storage memory MEMORY for later output to an aircraft monitoring system on the ground, or the data can be transmitted to an aircraft monitoring system on the ground during an existing voice communication call, or the communication link can be automatically activated to originate a data transfer call when the non-terrestrial mobile subscriber station MS is not in use. The control circuit C in the non-terrestrial mobile subscriber station MS can, in well-known fashion, scan the data output terminals of the various elements of the avionics to retrieve the desired data. This enables the non-terrestrial mobile subscriber station MS to function as a real-time aircraft safety and maintenance system.

As part of the communication function, the non-terrestrial mobile subscriber station MS can function to receive weather maps from air weather services. The weather maps can be generated at a ground station and transmitted to the aircraft in a compact data representation, with the particular content of the weather map being a function of the data needs of the pilot. Such a system is described in U.S. Pat. No. 5,490,239, titled "Virtual Reality Imaging System." The non-terrestrial mobile subscriber station MS can therefore provide frequent updates to the weather maps using the data communication capabilities noted above and can enable the pilot to revise the flight plan and receive revised weather maps commensurate with the revised flight plan.

Pilot-Controller Communications

The aircraft has an existing set of communications equipment for pilot to air traffic controller communications. The non-terrestrial mobile subscriber station MS can function as a redundant communication facility to supplement these existing facilities. Alternatively, the non-terrestrial mobile subscriber station MS can exclusively perform this function. Furthermore, the non-terrestrial mobile subscriber station MS can add GPS aircraft position data to the information communicated to the air traffic control systems for accurate aircraft position updates.

Aircraft Operations Support

As also shown in FIG. 12B, the non-terrestrial mobile subscriber station MS can be equipped with both data processing DPD and data storage memory DS elements to thereby enable the non-terrestrial mobile subscriber station MS to perform additional support functions. In particular, the data related to the flight schedule of the aircraft can be stored in the data storage memory DS and transmitted to and received from ground-based systems via the cellular communication connections established by the non-terrestrial mobile subscriber station MS. The types of data can include: passenger manifest, gate departure assignments for connecting flights at the destination airport, and the like.

Value Added Services

The non-terrestrial mobile subscriber station MS can provide value added communication services, such as call forwarding, call waiting, call conferencing, data call communications, caller ID, last call redial, and the like. These services are part of the existing public switched telephone network and the non-terrestrial mobile subscriber station MS can be managed for call connections through this network as a traditional ground-based subscriber station.

Summary

The non-terrestrial cellular mobile telecommunication station uses a number of non-interference techniques to extend the usage of existing cellular mobile telecommunication radio frequencies allocated for ground-based communications to the non-terrestrial realm. For example, the polarization of the signals produced by the antenna elements of the non-terrestrial cellular mobile telecommunication station is different than and preferably substantially orthogonal to the polarization of the cellular radio signals produced by the ground-based antennas to thereby minimize the possibility of interference with the ground-based radio signals. Furthermore, the control signals exchanged between the non-terrestrial mobile subscriber stations and the non-terrestrial cell site controller are architected to avoid the possibility of interference with ground-based cell site transmitter-receiver pairs. The transmit power of the non-terrestrial cellular mobile telecommunication station is also tightly controlled and of a magnitude to be rejected by the ground-based mobile subscriber stations and cell site transmitter-receiver pairs.

What is claimed:

1. Cellular radio communication apparatus, operable as a non-terrestrial cellular mobile telecommunication station using at least one of the plurality of radio frequencies allocated for ground-based cellular mobile telecommunication stations, for communications within a non-terrestrial mobile telecommunication system in a same geographic area, comprising:

means for generating a radio frequency communication signal at a one of said radio frequencies allocated for ground-based cellular mobile telecommunication stations;

means, responsive to receipt of subscriber data, said subscriber data comprising at least one of: voice and data signals received from at least one of: a subscriber and adjunct data producing equipment, for inserting said subscriber data into said radio frequency communication signal to create a composite radio frequency signal consisting of said subscriber data and said radio frequency communication signal;

means for transmitting said composite radio frequency signal to a non-terrestrial mobile telecommunication system; and wherein said means for generating and said means for transmitting are operable to produce said composite radio frequency communication signal to be substantially identical to and non-interfering with radio frequency communication signals generated by ground-based cellular mobile telecommunication stations.

2. The cellular radio communication apparatus of claim 1 wherein said means for transmitting comprises:

means for polarizing said composite radio frequency signal in a polarization that is substantially orthogonal to a polarization of radio frequency communication signals generated by said ground-based cellular mobile telecommunication stations.

3. The cellular radio communication apparatus of claim 1 wherein said means for generating comprises:

means for reversing uplink and downlink functions of said generated composite radio frequency signal from radio frequency communication signals generated by said ground-based cellular mobile telecommunication stations.

4. The cellular radio communication apparatus of claim 1 wherein said means for generating comprises:

means for offsetting transmit and receive frequencies of said generated composite radio frequency signal to be interstitial to radio frequency communication signals generated by said ground-based cellular mobile telecommunication stations.

5. The cellular radio communication apparatus of claim 1 wherein said means for transmitting comprises:

means for outputting said generated composite radio frequency signal at a power that is significantly reduced from a power used by said radio frequency communication signals generated by said ground-based cellular mobile telecommunication stations.

6. The cellular radio communication apparatus of claim 1 wherein said means for transmitting comprises:

antenna means for generating signals polarized substantially orthogonal to signals generated by said ground-based cellular mobile telecommunication stations.

7. The cellular radio communication apparatus of claim 1 wherein said means for generating a radio frequency communication signal comprises:

means for generating a channel signal which comprises a communication space, which communication space is divided into control channels and communication channels.

8. The cellular radio communication apparatus of claim 7 wherein said means for generating a channel signal generates said control channels, which are selected to correspond to communication channels for ground-based cellular mobile telecommunication stations.

9. The cellular radio communication apparatus of claim 8 further comprising:

receiver means operable to fail to decode control signals transmitted by ground-based subscriber stations in control channels for ground-based cells, which control channels for ground-based cells correspond to communication channels generated by said means for generating a channel signal.

10. The cellular radio communication apparatus of claim 8 further comprising:

receiver means operable to fail to decode control signals transmitted by ground-based subscriber stations in control channels for ground-based cells, which control channels for ground-based cells correspond to communication channels used by said non-terrestrial mobile telecommunication system to communicate with said non-terrestrial cellular mobile telecommunication station.

11. The cellular radio communication apparatus of claim 8 wherein said means for generating a channel signals comprises:

selecting said control channels to correspond to control channels for ground-based cellular mobile telecommunication stations.

12. The cellular radio communication apparatus of claim 1 wherein said means for inserting comprises:

means for receiving data transmitted by at least one ground-based telemetry station; and means for storing said received data.

13. The cellular radio communication apparatus of claim 12 wherein said means for inserting further comprises:

means for originating a communication connection to a data collection system via said composite radio frequency signal; and means for downloading said data from said means for storing to said data collection system.

14. The cellular radio communication apparatus of claim 13 wherein said means for inserting further comprises:

means for periodically activating said means for receiving.

15. The cellular radio communication apparatus of claim 1 wherein said means for inserting comprises:
   means for receiving data transmitted by at least one ground-based telemetry station;
   means for originating a communication connection to a data collection system via said composite radio frequency signal; and
   means for downloading said data from said means for storing to said data collection system.

16. The cellular radio communication apparatus of claim 1 wherein said generated radio frequency signal comprises a plurality of signal slots multiplexed together into a channel, said means for generating comprises:
   means for allocating at least one of said multiplexed signal slots exclusively for use by non-terrestrial communication stations.

17. A method of operating a cellular radio communication apparatus, operable as a non-terrestrial cellular mobile telecommunication station using at least one of the plurality of radio frequencies allocated for ground-based cellular mobile telecommunication stations, for communications within a non-terrestrial mobile telecommunication system in a same geographic area, comprising the steps of:
   generating a radio frequency communication signal at a one of said radio frequencies allocated for ground-based cellular mobile telecommunication stations;
   inserting, in response to receipt of subscriber data, said subscriber data comprising at least one of: voice and data signals received from at least one of: a subscriber and adjunct data producing equipment, said subscriber data into said radio frequency communication signal to create a composite radio frequency signal consisting of said subscriber data and said radio frequency communication signal;
   transmitting said composite radio frequency signal to a non-terrestrial mobile telecommunication system; and
   wherein said steps of generating and transmitting are operable to produce said composite radio frequency communication signal to be substantially identical to and non-interfering with radio frequency communication signals generated by ground-based cellular mobile telecommunication stations.

18. The method of claim 17 wherein said step of transmitting comprises:
   polarizing said composite radio frequency signal in a polarization that is substantially orthogonal to a polarization of radio frequency communication signals generated by said ground-based cellular mobile telecommunication stations.

19. The method of claim 17 wherein said step of generating comprises:
   reversing uplink and downlink functions of said generated composite radio frequency signal from radio frequency communication signals generated by said ground-based cellular mobile telecommunication stations.

20. The method of claim 17 wherein said step of generating comprises:
   offsetting transmit and receive frequencies of said generated composite radio frequency signal to be interstitial to radio frequency communication signals generated by said ground-based cellular mobile telecommunication stations.

21. The method of claim 17 wherein said step of transmitting comprises:
   outputting said generated composite radio frequency signal at a power that is significantly reduced from a power used by said radio frequency communication signals generated by said ground-based cellular mobile telecommunication stations.

22. The method of claim 17 wherein said step of generating a radio frequency communication signal comprises:
   generating a channel signal which comprises a communication space, which communication space is divided into control channels and communication channels.

23. The method of claim 22 wherein said step of generating a channel signal generates said control channels, which are selected to correspond to communication channels for ground-based cellular mobile telecommunication stations.

24. The method of claim 23 further comprising:
   failing to decode control signals transmitted by ground-based subscriber stations in control channels for ground-based cells, which control channels for ground-based cells correspond to communication channels generated by said step of generating a channel signal.

25. The method of claim 24 further comprising:
   failing to decode control signals transmitted by ground-based subscriber stations in control channels for ground-based cells, which control channels for ground-based cells correspond to communication channels used by said non-terrestrial mobile telecommunication system to communicate with said non-terrestrial cellular mobile telecommunication station.

26. The method of claim 23 wherein said step of generating a channel signals comprises:
   selecting said control channels to correspond to control channels for ground-based cellular mobile telecommunication stations.

27. The method of claim 17 wherein said step of inserting comprises:
   receiving data transmitted by at least one ground-based telemetry station; and
   storing said received data in a memory.

28. The method of claim 27 wherein said step of inserting further comprises:
   originating a communication connection to a data collection system via said composite radio frequency signal; and
   downloading said data from said memory to said data collection system.

29. The method of claim 17 wherein said step of inserting comprises:
   receiving data transmitted by at least one ground-based telemetry station;
   originating a communication connection to a data collection system via said composite radio frequency signal; and
   downloading said data from said step of storing to said data collection system.

30. The method of claim 17 wherein said generated radio frequency signal comprises a plurality of signal slots multiplexed together into a channel, said step of generating comprises:
   allocating at least one of said multiplexed signal slots exclusively for use by non-terrestrial communication stations.

* * * * *